United States Patent
Liebfarth et al.

(10) Patent No.: US 11,667,733 B2
(45) Date of Patent: Jun. 6, 2023

(54) POLYVINYL ESTERS AND METHODS RELATED THERETO

(71) Applicant: The University of North Carolina at Chapel Hill, Chapel Hill, NC (US)

(72) Inventors: Frank Liebfarth, Carrboro, NC (US); Aaron Teator, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 163 days.

(21) Appl. No.: 17/269,247

(22) PCT Filed: Aug. 15, 2019

(86) PCT No.: PCT/US2019/046723
§ 371 (c)(1),
(2) Date: Feb. 17, 2021

(87) PCT Pub. No.: WO2020/037163
PCT Pub. Date: Feb. 20, 2020

(65) Prior Publication Data
US 2021/0324121 A1    Oct. 21, 2021

Related U.S. Application Data

(60) Provisional application No. 62/719,240, filed on Aug. 17, 2018.

(51) Int. Cl.
  C08F 16/20    (2006.01)
  C08F 16/18    (2006.01)
  C08F 116/20   (2006.01)
  C08F 116/18   (2006.01)
  C08F 216/20   (2006.01)
  C08F 216/18   (2006.01)

(52) U.S. Cl.
  CPC ............ *C08F 16/20* (2013.01); *C08F 16/18* (2013.01); *C08F 116/18* (2013.01); *C08F 116/20* (2013.01); *C08F 216/18* (2013.01); *C08F 216/20* (2013.01)

(58) Field of Classification Search
  CPC ...... C08F 216/20; C08F 216/18; C08F 16/20; C08F 16/18; C08F 116/20; C08F 116/18
  See application file for complete search history.

(56) References Cited

U.S. PATENT DOCUMENTS 5,159,004 A * 10/1992 Furuta ............... C08L 51/06
                                                525/92 D
5,284,681 A *  2/1994 Shinonaga .......... C08G 69/48
                                                427/322

(Continued)

OTHER PUBLICATIONS

Matsuzaki, Kei et al., "13C Nuclear magnetic Resonance Studies on the Stereochemical Configurations of 2,4-dimethyoxypentane and Poly(alkyl Vinyl Ethers)", 1973 Journal of Polymer Science: Polymer Chemistry Edition vol. 11 p. 971-987 (Year: 1973).*

(Continued)

*Primary Examiner* — Ling Siu Choi
*Assistant Examiner* — David L Miller
(74) *Attorney, Agent, or Firm* — Ballard Spahr LLP

(57) ABSTRACT

Disclosed herein are isotactic polyvinyl ethers and improved methods of making same. The method disclosed herein can produce polyvinyl ethers having a higher isotacticity as compared to polyvinyl ethers prepared with conventional methods.

16 Claims, 14 Drawing Sheets

(56) References Cited

U.S. PATENT DOCUMENTS

| | | | |
|---|---|---|---|
| 6,096,393 A * | 8/2000 | Ikeda | C08F 8/12 428/34.7 |
| 2015/0210788 A1* | 7/2015 | Okamoto | B32B 27/32 524/557 |

OTHER PUBLICATIONS

By Fishbein and Crowe, The Relation of Structure of Some Physical and Mechanical Properties of Poly (Vinyl Alkyl Ethers), Makromol. Chem. 48, 221-228, 1961.

By kanazawa et al., Recent Progress in Living Cationic Polymerization of Vinyl Ethers, Chem Lett, 39, 1232-1237, 2010.

By Kawaguchi et al., "Polymerization of Vinyl Ethers with Transition-Metal Catalysts: An Examination of the Stereoregularity of the Formed Polymers", Journal of Polymer Science, 40, 3938-3943, 2002.

By Ouchi et al., "Stereoregulation in Cationic Polymerization by Designed Lewis Acids. II. Effects of Alkyl Vinyl Ether Stracture", Journal of Polymer Science, 39, 1060-1066, 2001.

By Matsuzaki et al., 13C Nuclear Magnetic Resonance Studies on the Stereochemical Configurations of 2,P-Dimethoxypentane and Poly( alkyl Vinyl Ethers), Journal of Polymer Science, 11, 971-987, 1973.

By Ohgi and Sato, Highly isotactic poly(vinyl alcohol). III: Heterogeneous cationic polymerization of tert-butyl vinyl ether, Polymer, 43, 3829-3836, 2002.

By Ouchi et al., "Stereoregulation in Cationic Polymerization. III. High Isospecificity with the Bulky Phosphoric Acid [(RO)2PO2H]/SnC14 Initiating Systems: Design of Counteranions via Initiators", Journal of Polymer Science, 39, 1067-1074, 2001.

By Ouchi et al., "Stereoregulation in Cationic Polymerization by Designed Lewis Acids. 1. Highly Isotactic Poly(isobutyl vinyl ether) with Titanium-Based Lewis Acids 1", Macromolecules, 32, 6407-6411, 1999.

By Sawamoto, "Modern Cationic Vinyl Polymeraization", Prog. Polym. Sci., 16, 111-172, 1991.

By Oishi and Yamamoto, "Poly merization of t-Butyl Vinyl Ether Mediated by an Aluminum Lewis Acid-TrF system and its Complex Structure-Tacticity Correlation", Bull. Chem. Soc. Jpn, 74, 1-10, 2001.

By Schildknecht et al., "Polyvinyl Isobutyl Ethers", Ind. Eng. Chem., 40, 2104-2115, 1948.

By Schildknecht et al., "Vinyl Alkyl Ethers", Ind. Eng. Chem., 39, 180-186, 1947.

By Yamamoto and Futatsugi, "Designer Acids: Combined Acid Catalysis for Asymmetric Synthesis", Angew, Chem, Int. Ed., 44, 1924-1942, 2005.

* cited by examiner

Radical copolymerization

- requires high ethylene pressure
  not applicable to α-olefins

Late-transition-metal-catalyzed copolymerization

- comonomer incorporation and polymer molecular
  weight inversely related

Post polymerization modification

- coincident chain degradation upon functionalization
  for branched polyolefins

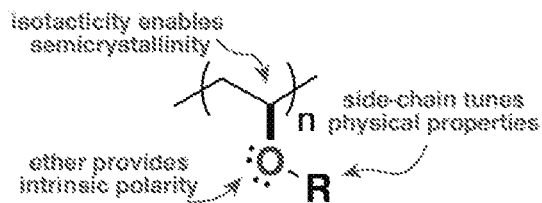
FIG. 2
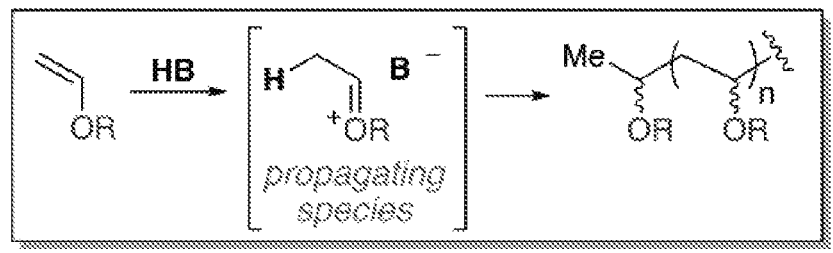
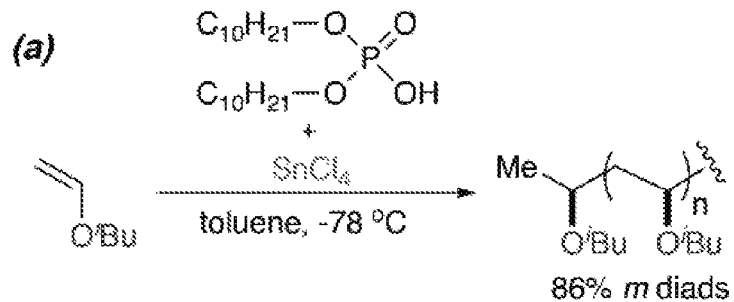
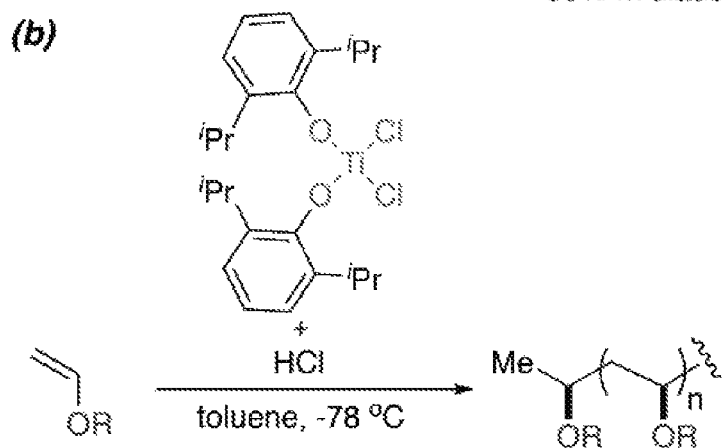
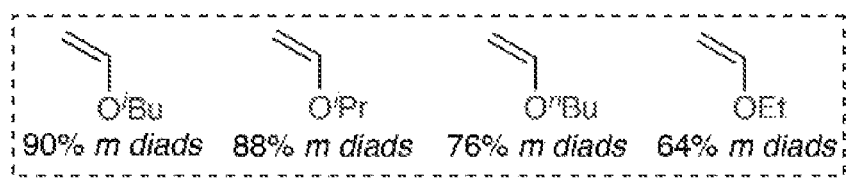
FIG. 3A and 3B

| [IBVE] (M) | LA | Additive | $M_n$ (kg mol$^{-1}$) | $Đ$ | $m$ (%) |
|---|---|---|---|---|---|
| 0.38 | TiCl$_4$ | none | 86 | 1.9 | 87 |
| 0.38 | TiCl$_4$(THF)$_2$ | none | 70 | 1.9 | 91 |
| 0.38 | TiCl$_4$(THF)$_2$ | THF (10 mM) | 69 | 2.4 | 92 |
| 0.10 | TiCl$_4$(THF)$_2$ | THF (10 mM) | 24 | 1.6 | 93 |

| R | $M_n$ (kg mol$^{-1}$) | Đ | m (%) | $T_g$ (°C) | $T_m$ (°C) |
|---|---|---|---|---|---|
| Et | 67 | 2.3 | 92 | -42 | a |
| Pr | 176 | 2.3 | 92 | -48 | 73 |
| iPr | 89 | 2.8 | 88 | -14 | 140 |
| Bu | 110 | 2.6 | 93 | -53 | 65 |
| iBu | 79 | 2.0 | 91 | -20 | 138 |
| tBu | 13 | 1.7 | 75 | N/A | N/A |
| iAmyl | 62 | 2.2 | 91[b] | -10 | 71 |
| neoPent | c | c | c | 27 | 230 |

[a] amorphous [b] est. by peak deconvolution of 13C NMR [c] insoluble in common organic solvents

C

LLDPE
104.0±0.5° poly(iBVE)
93.1±0.4°

| NBVE : IBVE | $T_g$ (°C) | $T_m$ (°C) | $T_c$ (°C) |
| --- | --- | --- | --- |
| 0 : 100 | -20 | 138 | 111 |
| 20 : 80 | -22 | 122 | 92 |
| 31 : 69 | -31 | 105 | 75 |
| 44 : 56 | -37 | 89 | 63 |
| 54 : 46 | -42 | 74 | 44 |
| 63 : 37 | -45 | 63 | 31 |
| 74 : 26 | -49 | 56 | 29 |
| 87 : 13 | -51 | 48 | 20 |
| 100 : 0 | -54 | 65 | 26 |

R = H, Ar =

71% *m*

R = *n*-C₄H₉, Ar =

75% *m*

76% *m*

POLYVINYL ESTERS AND METHODS RELATED THERETO

This Application is a national phase application under 35 U.S.C. 371 of International Application No. PCT/US2019/046723, filed on Aug. 15, 2019, which claims the benefit of U.S. Application No. 62/719,240, filed on Aug. 17, 2018, the contents of both applications are incorporated herein by reference in their entireties.

This application claims the benefit of U.S. Provisional Application No. 62/719,240, filed on Aug. 17, 2018, the contents of which is incorporated herein by reference in its entirety.

STATEMENT REGARDING FEDERALLY SPONSORED RESEARCH

This invention was made with Government support under Grant No. 5109847, awarded by the Army Research Office (ARO). The Government has certain rights in the invention.

BACKGROUND

Polyolefins are high-volume, low-cost thermoplastics with high tensile strength, low density, attractive chemical resistance, and excellent processibility. Currently, polyolefins constitute nearly 55% of world polymer production (Hutley, *Polyolefin Compounds and Materials: Fundamentals and Industrial Applications*, I. Al-Ali AlMa'adeed, M., Krupa, Ed. (Springer International Publishing, Chain, 2016), pp. 13-50). These hydrocarbons, however, do not interface well with other materials, drastically limiting their ability to form composites, coatings, adhesives, or to be used in high-performance engineering applications (Franssen, *Chem. Soc. Rev.* 42, 5809 (2013)). This limitation has driven decades of research and development toward new polar thermoplastics, see FIG. 1. Imparting functionality onto these materials without compromising the desirable properties of the parent material would uncover new and valuable functions not typically associated with polyolefins.

Some approaches to polar polyolefins predominately include the copolymerization of α-olefins with functional monomers (Ito, *Chem. Rec.* 10, 315-325 (2010); Ittel, *Chem. Rev.* 100, 1169-1204 (2000)) or the post-polymerization modification of commodity polyolefins. For example, the radical-mediated copolymerization of ethylene and either vinyl acetate or acrylate comonomers has resulted in a number of commercial copolymers sold under brand names such as Nucrel®, Surlyn®, and Elvax®. To counteract the difference in rate between these monomers, the polymerizations are typically conducted at 1000 to 3000 atmospheres of ethylene in an undefined, process driven approach (B. Elvers, Ed., *Ullmann's Polymers and Plastics* (Wiley-VCH, Weinheim, 2016)). This method has poor control of molecular weight, branching ratios, and distribution of polar groups along the polymer backbone that limits the diversity and tunability of accessible properties. Furthermore, radical polymerization precludes the use of α-olefins, which greatly restricts the range of potential materials.

The transition-metal catalyzed copolymerization of olefins with polar vinyl monomers has been a long-standing goal. The high oxophilicity of early transition metals leads to catalyst poisoning by strongly-donating Lewis bases and hinders their utility (T. C. Chung, Synthesis of functional polyolefin copolymers with graft and block structures. *Prog. Polym. Sci.* 27, 39-85 (2002)). Late-transition metal catalysts, which are generally more tolerant to polar functionality, have shown promise (Ito, *Chem. Rec.* 10, 315-325 (2010); Ittel, *Chem. Rev.* 100, 1169-1204 (2000); Domski, *Prog. Polym. Sci.* 32, 30-92 (2007)). Although significant effort has been devoted to this research area, state-of-the-art phosphine sulfonate (and related) palladium complexes provide low molecular weights at moderate functional group incorporation and insufficient catalytic activities (Carrow, *Macromolecules* 47, 2541-2555 (2014); Nakamura, *Acc. Chem. Res.* 46, 1438-1449 (2013); Zhang, *J. Am. Chem. Soc.* 140, 8841-8850 (2018); Kenyon, *J. Am. Chem. Soc.* 140, 6685-6689 (2018)).

The post-polymerization modification of polyolefins to install polar functionality is a contemporary area of interest (Boaen, *Chem. Soc. Rev.* 34, 267 (2005)). The primary commercial approach involves the homolysis of C—H bonds initiated by the thermal decomposition of peroxides and subsequent trapping of the carbon-centered radical with maleic anhydride (G. Moad, *Prog. Polym. Sci.* 24, 81-142 (1999)). The harsh reaction conditions and substrate-dictated regioselectivity of these methods lead to deleterious side reactions such as chain transfer and beta-scission that degrade the properties of the parent material (Gloor, *Polymer* 35, 1012-1030 (1994)). For example, maleic anhydride incorporation into polypropylene is inversely proportional to molecular weight and materials with relevant levels of functionality fall below the entanglement molecular weight (M. Zhang, *Macromolecules* 46, 4313-4323 (2013)). Modem methods either use precious metals or expensive reagents and do not interface with industrial reactive extrusion approaches (Kondo, *J. Am. Chem. Soc.* 124, 1164-1165 (2002); Bae, *Angew. Chem. Int. Ed.* 44, 6410-6413 (2005); Bunescu, *ACS Cent. Sci.* 3, 895-903 (2017); Mar Diaz-Requejo, *Macromolecules* 38, 4966-4969 (2005); Ray, *Chem. Commun.*, 3388 (2005); Williamson, *Angew. Chem. Int. Ed.* 57, 6261-6265 (2018)).

A universal limitation to all of these methods is that the addition of polar groups adversely affects the thermal and mechanical properties of the parent material. Ideally, the polarity and physical properties of these thermoplastics could be decoupled, providing an approach to control the polymer functionality without simultaneously altering the desirable thermal and mechanical properties.

Thus, there remains a need for improved isotactic polyvinyl ethers and improved methods of making isotactic polyvinyl ethers.

SUMMARY

In accordance with the purpose(s) of the invention, as embodied and broadly described herein, the invention, in one aspect, relates to polyvinyl ethers and methods related thereto.

Disclosed herein is a method the step of: polymerizing one or more vinyl ether monomers in the presence of a catalyst having the structure selected from

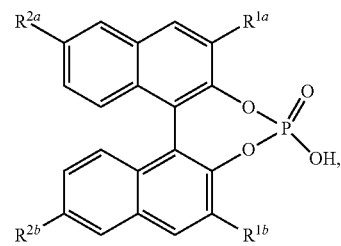

-continued

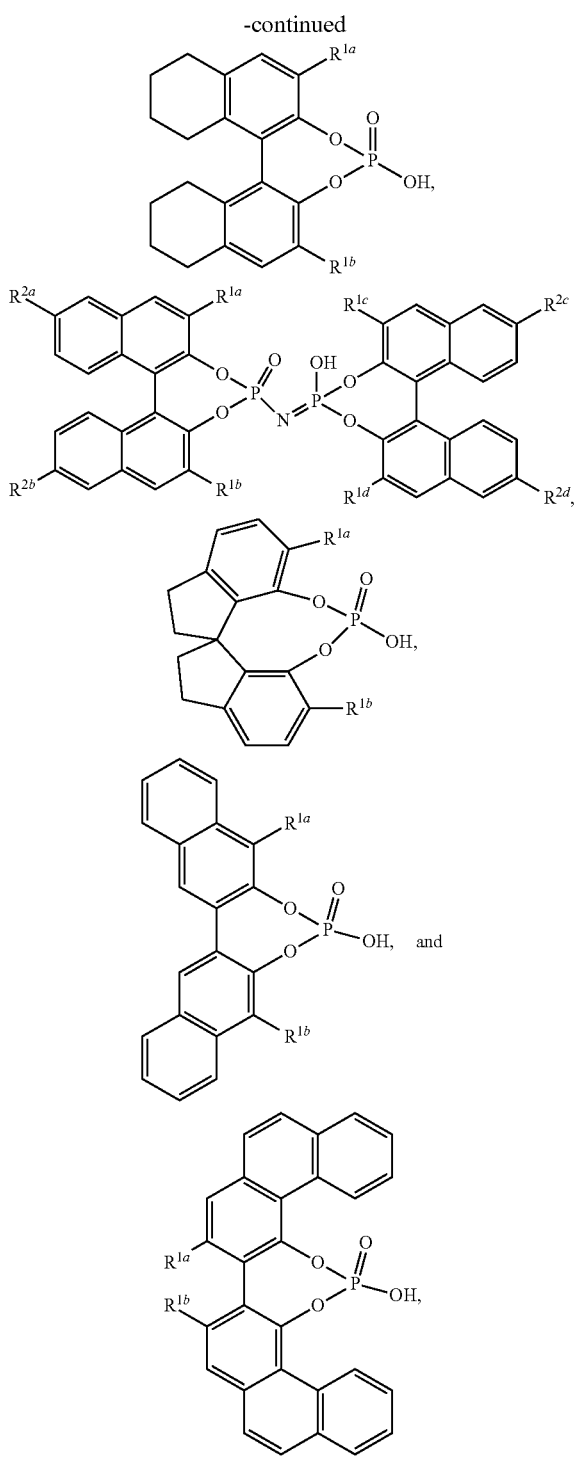

wherein each of the $R^{1a}$, $R^{1b}$, $R^{1c}$, and $R^{1d}$ is independently selected from halogen, —CN, —NH$_2$, —OH, cycloalkyl, heterocycloalkyl, aryl, heteroaryl, C1-C12 alkyl, C1-C12 haloalkyl, C1-C12 hydroxyalkyl, C1-C12 alkoxy, silyl, monocyclic aryl and multicyclic aryl, and each being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino, wherein each of the $R^{2a}$ and $R^{2b}$ is independently selected from hydrogen, halogen, aryl, and C1-C18 alkyl, and a Lewis acid additive, thereby producing a polymer.

Also disclosed herein is a polymer produced by the methods disclosed herein.

Also disclosed herein is a composition comprising:
a) a catalyst having the structure selected from

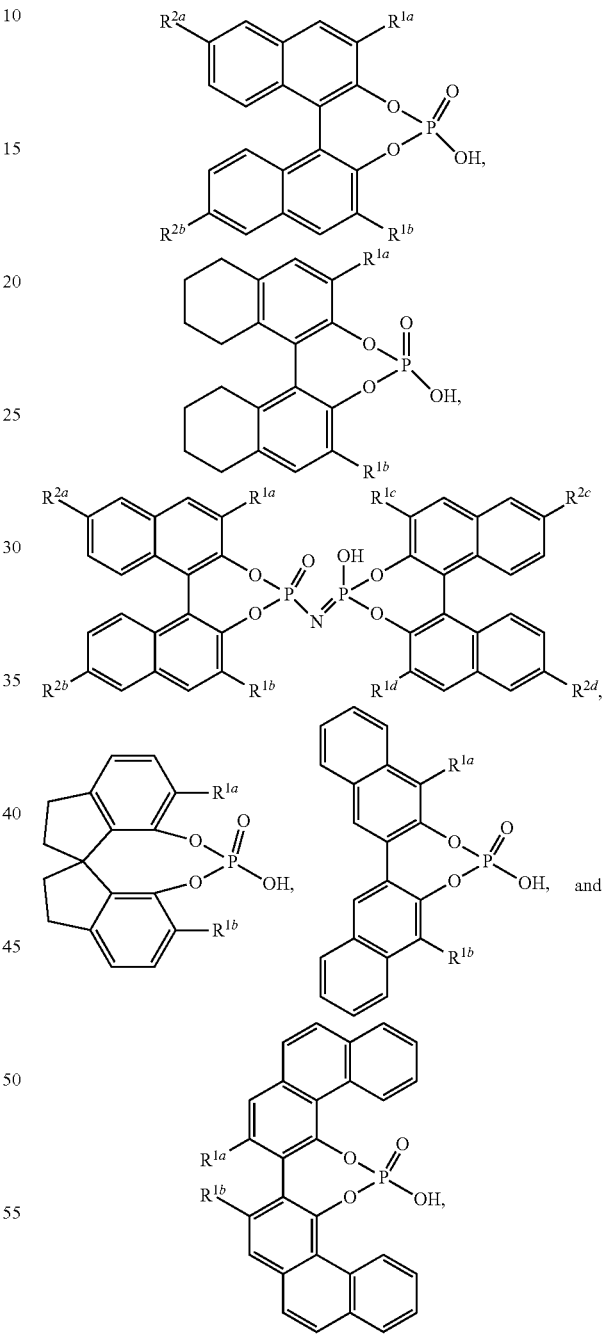

wherein each of the $R^{1a}$, $R^{1b}$, $R^{1c}$, and $R^{1d}$ is independently selected from halogen, —CN, —NH$_2$, —OH, cycloalkyl, heterocycloalkyl, aryl, heteroaryl, C1-C12 alkyl, C1-C12 haloalkyl, C1-C12 hydroxyalkyl, C1-C12 alkoxy, silyl, monocyclic aryl and multicyclic aryl, and each being substituted with 0, 1, 2, 3, 4, 5, 6, 7, 8, or 9 groups independently selected from halogen, —CN, —NH$_2$, —OH, CT-C6 alkyl, CT-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino, wherein each of the R$^{2a}$ and R$^{2b}$ is independently selected from hydrogen, halogen, aryl, and C1-C18 alkyl, b) a Lewis acid additive; and c) one or more vinyl ether monomers.

Also disclosed is a polymer comprising repeating units formed from ethyl vinyl ether, wherein the polymer has a tacticity of at least 75% m.

Also disclosed is a polymer comprising repeating units formed from n-propyl vinyl ether, wherein the polymer has a tacticity of at least 79% m.

Also disclosed is a polymer comprising repeating units formed from iso-propyl vinyl ether, wherein the polymer has a tacticity of at least 89% m.

Also disclosed is a polymer comprising repeating units formed from iso-amyl vinyl ether, wherein the polymer has a tacticity of at least 50% m.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

FIG. 2 shows the polar and mechanical properties of iso-PVEs as thermoplastics.

FIGS. 3A and 3B show previous attempts of stereocontrolled vinyl ether polymerization.

Figure 1:
FIG. 1 shows previous routes of making polar polyolefins.
Figure 1:
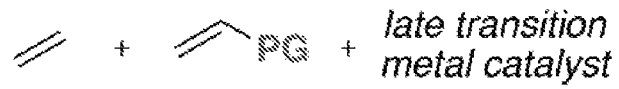
Figure 1:
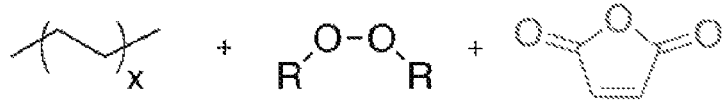

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which can require independent confirmation.

A. DEFINITIONS

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a component," "a polymer," or "a particle" includes mixtures of two or more such components, polymers, or particles, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance may or may not occur, and that the description includes instances where said event or circumstance occurs and instances where it does not.

The term "stable," as used herein, refers to compositions that are not substantially altered when subjected to conditions to allow for their production, detection, and, in certain aspects, their recovery, purification, and use for one or more of the purposes disclosed herein.

As used herein, the term "derivative" refers to a compound having a structure derived from the structure of a parent compound (e.g., a compound disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound. One ordinary skill in the art would understand the structure of a derivative, such as a cholesterol derivative.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "homopolymer" refers to a polymer formed from a single type of repeating unit (monomer residue).

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "cross-linked polymer" refers to a polymer having bonds linking one polymer chain to another.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. Non-limiting examples of alkyls include C1-18 alkyl, C1-C12 alkyl, C1-C8 alkyl, C1-C6 alkyl, C1-C3 alkyl, and C1 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

The term "alkenyl" as used herein is a hydrocarbon group of 2 to 24 carbon atoms with a structural formula containing at least one carbon-carbon double bond. The alkenyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkenyls include C2-18 alkenyl, C2-12 alkenyl, C2-8 alkenyl, C2-6 alkenyl, and C2-3 alkenyl.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkynyls include C2-18 alkynyl, C2-12 alkynyl, C2-8 alkynyl, C2-6 alkynyl, and C2-3 alkynyl.

The terms "amine" or "amino" as used herein are represented by the formula —$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "ester" as used herein is represented by the formula —$OC(O)A^1$ or —$C(O)OA^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -$(A^1O(O)C-A^2-C(O)O)_a$— or -$(A^1O(O)C-A^2-OC(O))_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -$(A^1O-A^2O)_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "azide" as used herein is represented by the formula —$N_3$.

The term "thiol" as used herein is represented by the formula —SH.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. POLYVINYL ETHERS AND METHODS

Isotactic poly(vinyl ether)s (iso-PVEs) can be a versatile and intrinsically polar class of semi-crystalline thermoplastics derived from inexpensive and underutilized feedstocks. As shown in FIG. 2, PVEs are an inherently polar class of polymers due to an ether in each repeat unit and, like polyolefins, have low glass transition temperatures and high thermal stabilities (G. Schroder, *Ullmann's Encycl. Ind. Chem.* 28, 481-485 (2000)). These materials, however, are typically amorphous at room temperature and thus of limited utility. Natta's pioneering contributions demonstrated the importance of controlling stereochemistry to achieve thermoplastic properties from α-olefins (G. Natta, *J. Am. Chem. Soc.* 77, 1708-1710 (1955)), and the same applies for PVEs (Schildknecht, *Ind. Eng. Chem.* 39, 180-186 (1947); Schildknecht, *Ind. Eng. Chem.* 40, 2104-2115 (1948)). Moderately iso-PVEs undergo crystallization and demonstrate plasticity and high tensile strength similar to polyolefins (Fishbein, *Die Makromol. Chemie* 48, 221-228 (1961)).

The first observation of tacticity influencing polymer properties was reported by Schildknecht in 1947 during the polymerization of iso-butyl vinyl ether (iBVE) (Schildknecht, *Ind. Eng. Chem.* 39, 180-186 (1947); Schildknecht, *Ind. Eng. Chem.* 40, 2104-2115 (1948)). This report inspired an effort toward the study the solid-state structure and properties of these intriguing materials (G. Natta, *Macromolecules* 2, 311-315 (1969); Natta, *Die Makromol. Chemie* 89, 81-94 (1965); Natta, *Die Makromol. Chemie* 18, 455-462 (1956); Natta, *Angew. Chem.* 71, 205-210 (1959); Schildknecht, *Polym. Eng. Sci.* 7, 257-263 (1967)). The primary synthetic methods at the time involved low temperature polymerization catalyzed by Lewis acids such as $BF_3(OEt)_2$ and $Al(OiPr)_3$ (Schildknecht, *Polym. Eng. Sci.* 7, 257-263 (1967)). Although these polymerizations gave materials of unremarkable isotacticities (60 to 70% meso diads), fractionation procedures that extracted the amorphous polymer were developed to isolate semi-crystalline materials for characterization by tensile experiments and diffraction (Hatada, *Polym. J.* 15 (1983), pp. 719-725).

Despite the promise of these materials, there have been few efforts toward stereocontrolled vinyl ether polymerization (Aoshima, *Polym. J.* 25 (1993), pp. 1161-1168; Ohgi *Polymer* 43, 3826-3836 (2002); Kawaguchi, *J. Polym. Sci. A Polym. Chem.* 40, 3938-3943 (2002); Huang, *J. Polym. Sci. A Polym. Chem.* 51, 546-556 (2013)). There is a challenge controlling facial addition of an incoming monomer to a cationic propagating chain end. The stereocontrolled polymerization of α-olefins is well-developed because a transition metal is bound to the polymer chain-end and, thus, ligand geometry around the metal can be tuned to control each monomer enchainment (Coates, *Chem. Rev.* 100, 1223-1252 (2000)). The propagating chain-end during the cationic vinyl ether polymerization, however, is an achiral oxocarbenium ion, see FIG. 3, to which it is much more challenging to control the facial addition of subsequent monomers (Sawamoto, *Prog. Polym. Sci.* 16, 111-172 (1991); Aoshima, *Chem. Rev.* 109, 5245-5287 (2009); Kanazawa, *Chem. Lett.* 39, 1232-1237 (2010)).

Modem methods for the stereocontrolled polymerization of vinyl ethers achieve only moderate levels of stereoselectivity and are not general to monomer class. For example, sterically demanding phosphoric acids were used in combination with $SnCl_4$ to polymerize iBVE with a meso diad percentage (% m) up to 86%, see FIG. 3 (Ouchi, *Polymer* 2, 1067-1074 (2001)). Taking a different approach, Yamamoto used a chiral binaphthyl-derived aluminum Lewis acid to realize poly(iBVE) up to 71% m (Yamamoto, *Bull. Chem. Soc. Jpn.* 74, 1445-1454 (2001)). Neither of these methods, however, reported achieving semi-crystalline PVEs.

A method for the stereocontrolled polymerization of vinyl ethers was through the use of a phenoxide-ligated titanium complex, see FIG. 3, to achieve poly(iBVE) up to 92% m (Ouchi, *Macromolecules* 32, 6407-6411 (1999)). This moderately isotactic poly(iBVE) was reported as a semi-crystalline material with a melting temperature ($T_m$) of 131° C. However, minor changes in monomer structure greatly influenced stereoselectivity (Ouchi, *J. Polym. Sci. A Polym. Chem.* 39, 1060-1066 (2001)). For example, while poly (iBVE) achieved 92% m, polymerization of n-butyl or ethyl vinyl ether resulted in polymers with 74% m and 64% m, respectively.

Stereocontrolled polymerization of a wide range of vinyl ether monomers to high levels of isotacticity (>90% m) is desired. The prior art has focused on creating large, achiral counter-ions that control tacticity via chain-end control. This approach lacks generality to monomer substrate and has failed to achieve common design principles for the stereocontrolled polymerization of vinyl ethers.

The methods disclosed herein combines the benefits of asymmetric ion-pairing catalysis (Brak, *Angew. Chem. Int. Ed.* 52, 534-561 (2013)) and Brønsted acid-assisted Lewis acidity (H. Yamamoto, K. Futatsugi, "Designer Acids": Combined Acid Catalysis for Asymmetric Synthesis. *Angew. Chem. Int. Ed.* 44, 1924-1942 (2005); Ishihara, *J. Am. Chem. Soc.* 116, 1561-1562 (1994)). The methods disclosed herein enable stereocontrolled polymerization of a range of vinyl ether monomers. The methods disclosed herein, in part, utilizes chiral BINOL-based phosphoric acid catalysis (Maji, *Chem. Soc. Rev.* 47, 1142-1158 (2018); Parmar, *Chem. Rev.* 114, 9047-9153 (2014); Akiyama, *Adv. Synth. Catal.* 348, 999-1010 (2006)) to provide a source of stereoinduction for monomer additions to an oxocarbenium chain end. The methods disclosed herein provide for a comprehensive approach to the long-standing challenge to produce iso-PVEs as a class of intrinsically polar materials.

Disclosed herein is a method the step of: polymerizing one or more vinyl ether monomers in the presence of a catalyst having the structure selected from

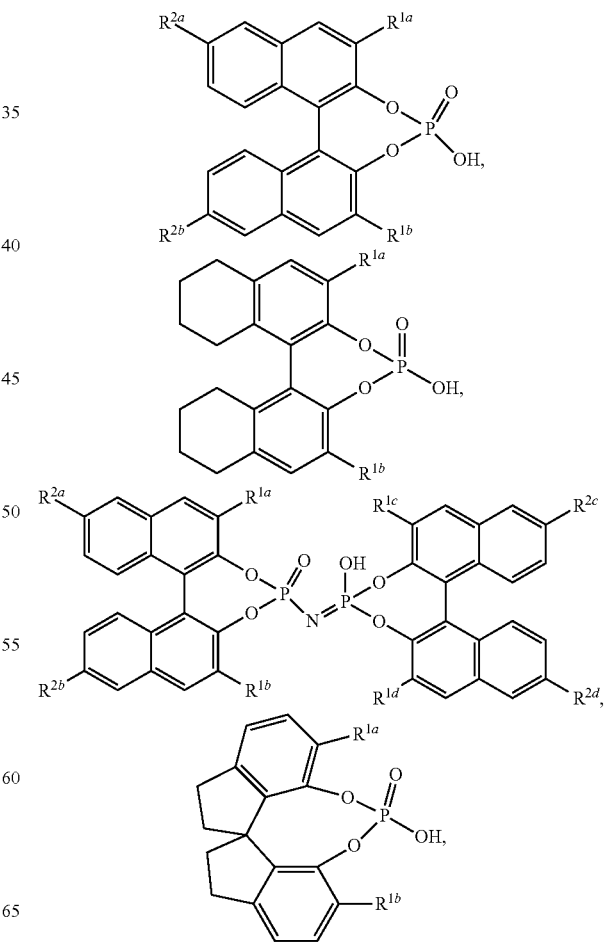

-continued

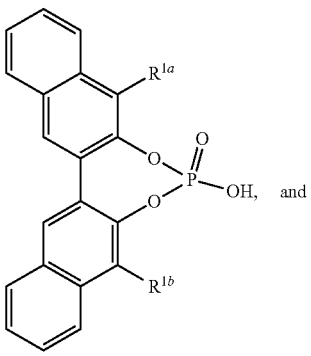

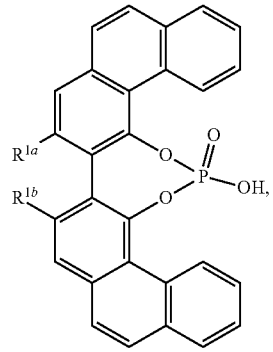

a) a catalyst having the structure selected from

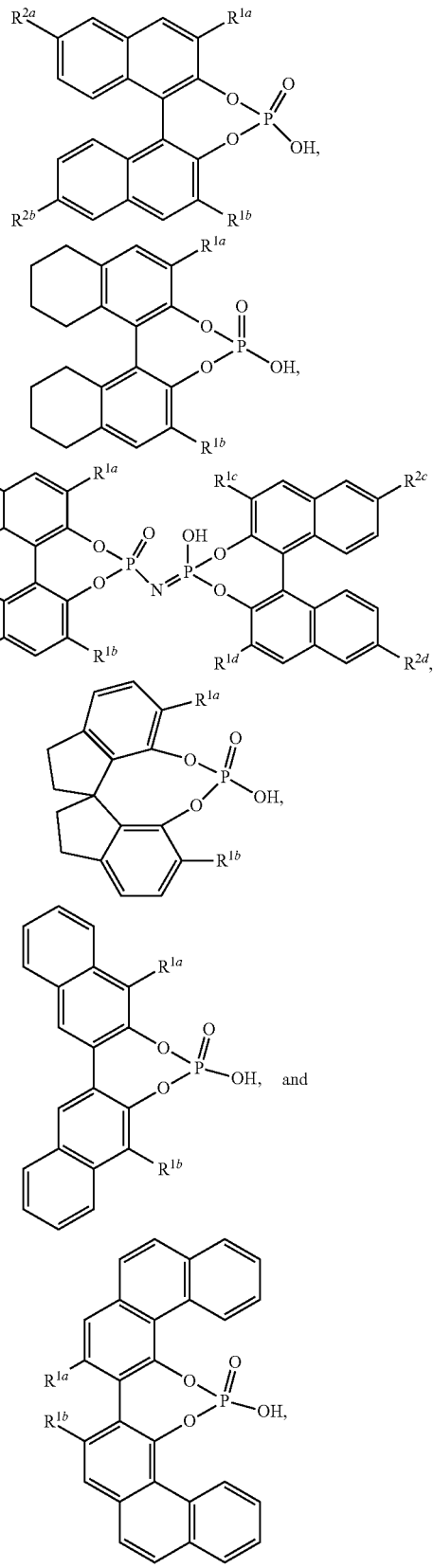

wherein each of the $R^{1a}$, $R^{1b}$, $R^{1c}$, and $R^{1d}$ is independently selected from halogen, —CN, —NH$_2$, —OH, cycloalkyl, heterocycloalkyl, aryl, heteroaryl, C1-C12 alkyl, C1-C12 haloalkyl, C1-C12 hydroxyalkyl, C1-C12 alkoxy, silyl, monocyclic aryl and multicyclic aryl, and each being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino, wherein each of the $R^{2a}$ and $R^{2b}$ is independently selected from hydrogen, halogen, aryl, and C1-C18 alkyl, and a Lewis acid additive, thereby producing a polymer.

In one aspect, the polymerization is a cationic polymerization. In another aspect, the polymerization is an anionic polymerization. In yet another aspect, the polymerization is a radical polymerization.

In one aspect, the method comprises prior to step a) mixing the catalyst and the Lewis acid additive. Mixing the catalyst and the Lewis acid additive prior to step a) can increase the isotacticity of the resulting polymer. Thus, the catalyst and the Lewis acid additive can be mixed prior to the addition of the one or more vinyl ether monomers.

In one aspect, the methods disclosed herein provides for a semi-crystalline polymer material.

Also disclosed herein is a polymer produced by the methods disclosed herein.

In one aspect, also disclosed herein is a composition comprising:

wherein each of the R$^{1a}$, R$^{1b}$, R$^{1c}$, and R$^{1d}$ is independently selected from halogen, —CN, —NH$_2$, —OH, cycloalkyl, heterocycloalkyl, aryl, heteroaryl, C1-C12 alkyl, C1-C12 haloalkyl, C1-C12 hydroxyalkyl, C1-C12 alkoxy, silyl, monocyclic aryl and multicyclic aryl, and each being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino, wherein each of the R$^{2a}$ and R$^{2b}$ is independently selected from hydrogen, halogen, aryl, and C1-C18 alkyl, b) a Lewis acid additive; and
c) one or more vinyl ether monomers.

In one aspect, the catalyst has the structure:

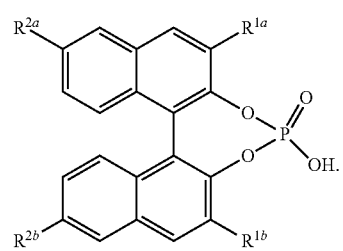

In one aspect, the catalyst has the structure:

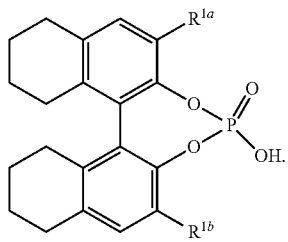

In one aspect, the catalyst has the structure:

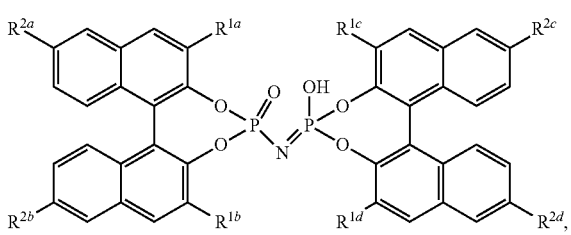

In one aspect, the catalyst has the structure:

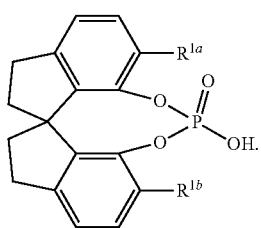

In one aspect, the catalyst has the structure:

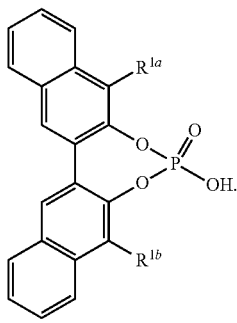

In one aspect, the catalyst has the structure:

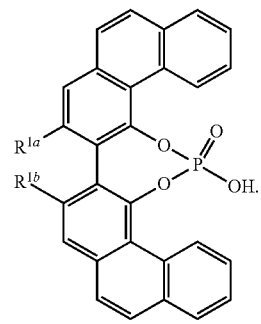

In one aspect, each of the R$^{1a}$, R$^{1b}$, R$^{1c}$, and R$^{1d}$ is independently selected from halogen, —CN, —NH$_2$, —OH, cycloalkyl, heterocycloalkyl, aryl, heteroaryl, C1-C12 alkyl, C1-C12 haloalkyl, C1-C12 hydroxyalkyl, C1-C12 alkoxy, silyl, and each being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino, In one aspect, each of the R$^{1a}$, R$^{1b}$, R$^{1c}$, and R$^{1d}$ is a monocyclic aryl being substituted with 0, 1, 2, 3, 4, or 5 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. For example, the each of the R$^{1a}$, R$^{1b}$, R$^{1c}$, and R$^{1d}$ is a monocyclic aryl being substituted with 1, 2, or 3 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. In another example, each of the R$^{1a}$, R$^{1b}$, R$^{1c}$, and R$^{1d}$ is a monocyclic aryl being substituted with 2-CF$_3$ groups. For example, each of the R$^{1a}$, R$^{1b}$, R$^{1c}$, and R$^{1d}$ is a monocyclic aryl being substituted in the 3, 5 positions independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. In yet another example, each of the R$^{1a}$, R$^{1b}$, R$^{1c}$, and R$^{1d}$ is a monocyclic aryl being substituted with 1, 2, 3, 4, or 5 groups independently selected from halogen, C1-C6 alkyl, C1-C6 haloalkyl, C1-C6 hydroxyalkyl, C1-C6 alkoxy, aryl, cycloalkyl, heteroaryl, and heterocycloalkyl.

In one aspect, each of the $R^{1a}$, $R^{1b}$, $R^{1c}$, and $R^{1d}$ is a multicyclic aryl being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. For example, each of the $R^{1a}$, $R^{1b}$, $R^{1c}$, and $R^{1d}$ is

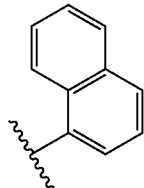 [SMILES: *c1cccc2ccccc12]

being substituted with 0, 1, 2, 3, 4, 5, 6, or 7 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. In another example, each of the $R^{1a}$, $R^{1b}$, $R^{1c}$, and $R^{1d}$ is

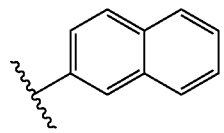

being substituted with 0, 1, 2, 3, 4, 5, 6, or 7 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. In another example, each of the $R^{1a}$, $R^{1b}$, $R^{1c}$, and $R^{1d}$ is

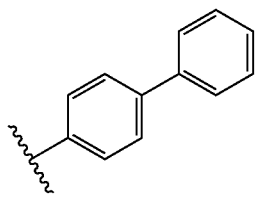 [SMILES: *c1ccc(-c2ccccc2)cc1]

being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino. In yet another example, each of the $R^{1a}$, $R^{1b}$, $R^{1c}$, and $R^{1d}$ is

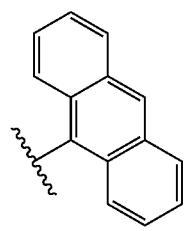 [SMILES: *c1c2ccccc2cc2ccccc12]

being substituted with 0, 1, 2, 3, 4, 5, 6, 7, 8, or 9 groups independently selected from halogen, —CN, —NH$_2$, —OH, C1-C6 alkyl, C1-C6 haloalkyl, C1-C6 hydroxyalkyl, C1-C6 alkoxy, aryl, cycloalkyl, heteroaryl, heterocycloalkyl, C1-C6 alkylamino, and (C1-C4)(C1-C4) dialkylamino.

In one aspect, $R^{2a}$ and $R^{2b}$ are hydrogen. In another aspect, $R^{2a}$ and $R^{2b}$ are aryl. In yet another aspect, $R^{2a}$ and $R^{2b}$ are C1-C18 alkyl, In one aspect, the catalyst has the structure:

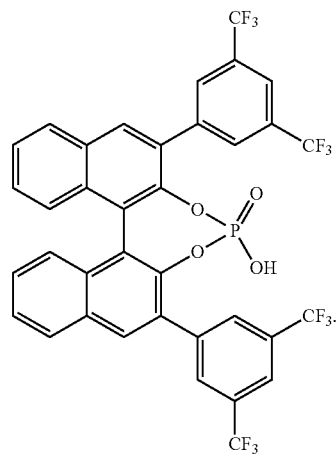 [SMILES: O=P1(O)Oc2c(-c3cc(C(F)(F)F)cc(C(F)(F)F)c3)cc3ccccc3c2-c2c(c(-c3cc(C(F)(F)F)cc(C(F)(F)F)c3)cc3ccccc23)O1]

In one aspect, the catalyst has the structure:

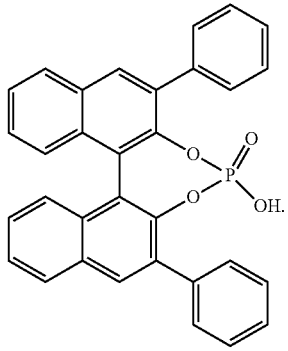 [SMILES: O=P1(O)Oc2c(-c3ccccc3)cc3ccccc3c2-c2c(c(-c3ccccc3)cc3ccccc23)O1]

In one aspect, the catalyst has the structure:

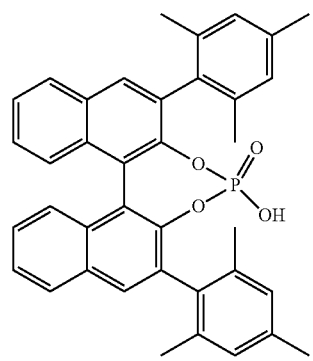

In one aspect, the catalyst has the structure:
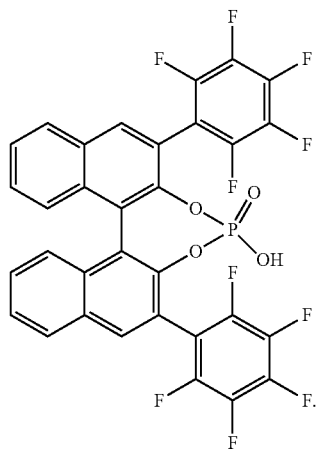 [SMILES: O=P1(O)Oc2c(-c3c(F)c(F)c(F)c(F)c3F)cc3ccccc3c2-c2c(c(-c3c(F)c(F)c(F)c(F)c3F)cc3ccccc23)O1]
In one aspect, the catalyst has the structure:
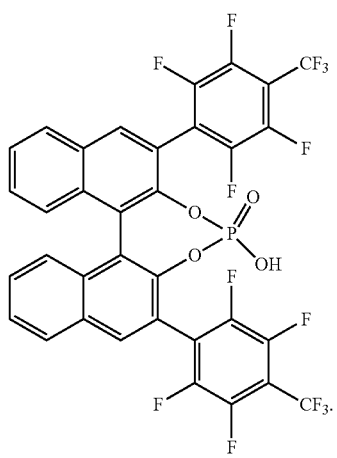 [SMILES: O=P1(O)Oc2c(-c3c(F)c(F)c(C(F)(F)F)c(F)c3F)cc3ccccc3c2-c2c(c(-c3c(F)c(F)c(C(F)(F)F)c(F)c3F)cc3ccccc23)O1]
In one aspect, the catalyst has the structure:
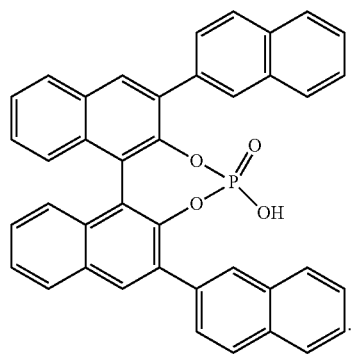 [SMILES: O=P1(O)Oc2c(-c3ccc4ccccc4c3)cc3ccccc3c2-c2c(c(-c3ccc4ccccc4c3)cc3ccccc23)O1]
In one aspect, the catalyst has the structure:
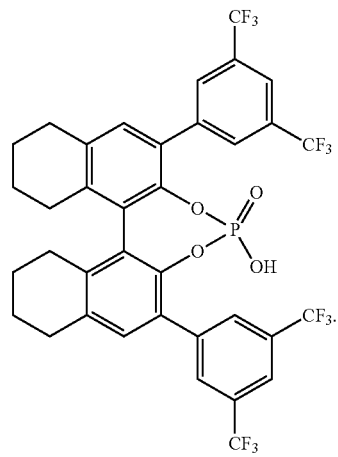 [SMILES: O=P1(O)Oc2c(-c3cc(C(F)(F)F)cc(C(F)(F)F)c3)cc3c(c2-c2c4c(cc(-c5cc(C(F)(F)F)cc(C(F)(F)F)c5)c2O1)CCCC4)CCCC3]
In one aspect, the catalyst has the structure:
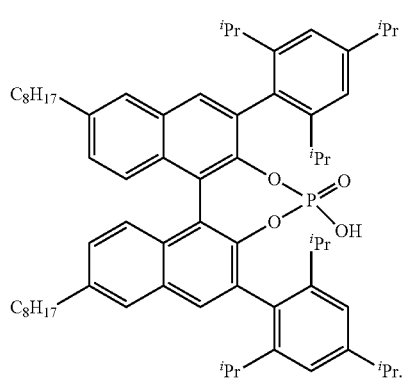
In one aspect, the catalyst has the structure:
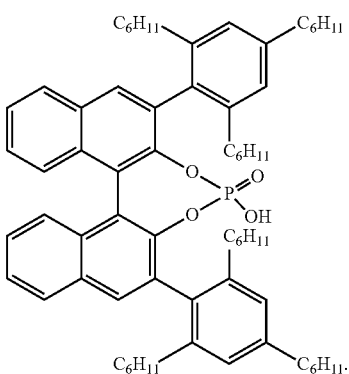

In one aspect, the catalyst has the structure:

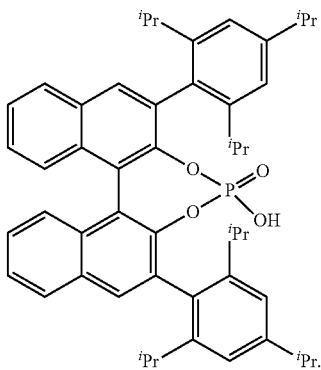 [SMILES: CC(C)c1cc(C(C)C)c(-c2cc3ccccc3c3c2OP(=O)(O)Oc2c(-c4c(C(C)C)cc(C(C)C)cc4C(C)C)cc4ccccc4c2-3)c(C(C)C)c1]

In one aspect, the catalyst has the structure:

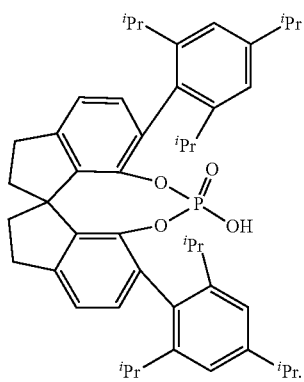 [SMILES: CC(C)c1cc(C(C)C)c(-c2ccc3c4c2OP(=O)(O)Oc2c(-c5c(C(C)C)cc(C(C)C)cc5C(C)C)ccc5c2C4(CC3)CC5)c(C(C)C)c1]

In one aspect, the catalyst has the structure:

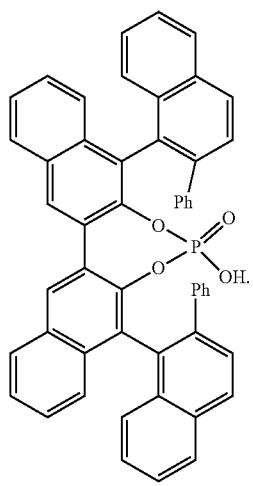 [SMILES: O=P1(O)Oc2c(cc3ccccc3c2-c2c(-c3ccccc3)ccc3ccccc23)-c2cc3ccccc3c(-c3c(-c4ccccc4)ccc4ccccc34)c2O1]

In one aspect, the catalyst has the structure:

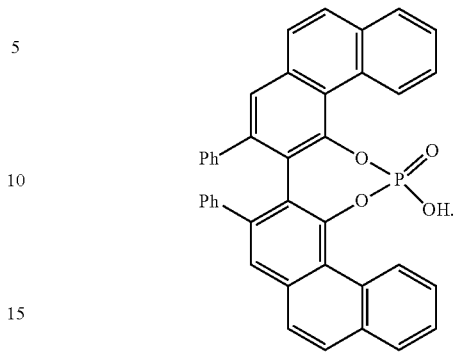

In one aspect, the one or more vinyl ether monomers has a structure represented by a formula selected from

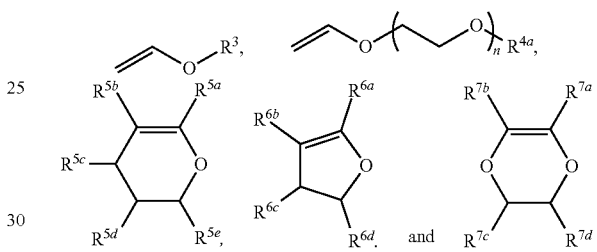

wherein $R^3$ is selected from C1-C20 alkyl, C1-C20 alkoxy, C1-C20 haloalkyl, cholesterol, cholesterol derivative, C3-C8 cycloalkyl, C6-C10 aryl, C3-C9 heterocycloalkyl, and C5-C9 heteroaryl, being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein $R^{4a}$ is selected from C1-C20 alkyl, C1-C20 alkoxy, C1-C20 haloalkyl, cholesterol, cholesterol derivative, C3-C8 cycloalkyl, C6-C10 aryl, C3-C9 heterocycloalkyl, and C5-C9 heteroaryl, —OH, and

being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein $R^{4b}$ is selected from C1-C20 alkyl, C1-C20 alkoxy, C3-C8 cycloalkyl, C6-C10 aryl, C3-C9 heterocycloalkyl, and C5-C9 heteroaryl, being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein n is from 1 to 100,
wherein each of $R^{5a}$, $R^{5b}$, $R^{5c}$, $R^{5d}$, and $R^{5e}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl,
wherein each of $R^{6a}$, $R^{6b}$, $R^{6c}$, and $R^{6d}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, and
wherein each of $R^{7a}$, $R^{7b}$, $R^{7c}$, and $R^{7d}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl.

In one aspect, the one or more vinyl ether monomers is two or more vinyl ether monomers each having a structure represented by a formula selected from

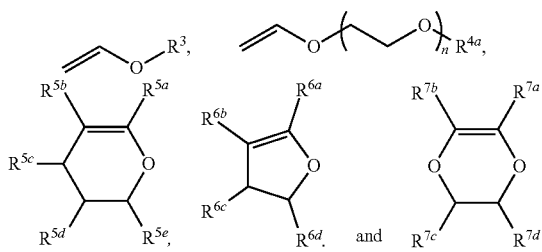

wherein $R^3$ is selected from C1-C20 alkyl, C1-C20 alkoxy, C1-C20 haloalkyl, cholesterol, cholesterol derivative, C3-C8 cycloalkyl, C6-C10 aryl, C3-C9 heterocycloalkyl, and C5-C9 heteroaryl, being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein $R^{4a}$ is selected from C1-C20 alkyl, C1-C20 alkoxy, C1-C20 haloalkyl, cholesterol, cholesterol derivative, C3-C8 cycloalkyl, C6-C10 aryl, C3-C9 heterocycloalkyl, and C5-C9 heteroaryl, —OH, and

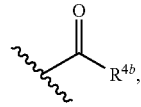

being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein $R^{4b}$ is selected from C1-C20 alkyl, C1-C20 alkoxy, C3-C8 cycloalkyl, C6-C10 aryl, C3-C9 heterocycloalkyl, and C5-C9 heteroaryl, being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, wherein n is from 1 to 100,
wherein each of $R^{5a}$, $R^{5b}$, $R^{5c}$, $R^{5d}$, and $R^{5e}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl,
wherein each of $R^{6a}$, $R^{6b}$, $R^{6c}$, and $R^{6d}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl, and
wherein each of $R^{7a}$, $R^{7b}$, $R^{7c}$, and $R^{7d}$ is independently selected from hydrogen, halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl.

When the one or more vinyl ether monomers is two or more vinyl ether monomers, a copolymer is formed. It is understood that each of the two or more vinyl ether monomers are different vinyl ether monomers that form a co-polymer. The co-polymer can be a random co-polymer.

In one aspect, n is 1. In another aspect, n is from 1 to 5, for example, 2, 3, 4, or 5. In yet another aspect, n is from 1 to 10, for example, 2, 3, 4, 5, 6, 7, 8, 9, or 10. In yet another aspect, n is from 1 to 50, for example, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

In one aspect, the one or more vinyl ether monomers has the structure:

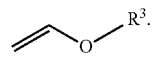

In one aspect, the one or more vinyl ether monomers has the structure:

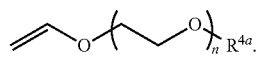

In one aspect, the one or more vinyl ether monomers has the structure:

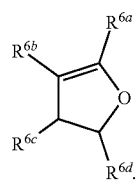

In one aspect, the one or more vinyl ether monomers has the structure:

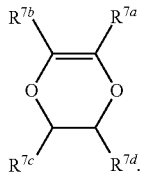

In one aspect, the one or more vinyl ether monomers has the structure:

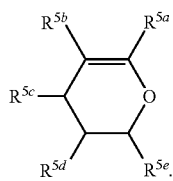

In one aspect, $R^3$ is C1-C20 alkyl being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl. For example, $R^3$ can be C1-C12. In another example, $R^3$ can be C2-C5. In yet another example, $R^3$ can be C2-C4.

In another aspect, $R^3$ is selected from cholesterol and a cholesterol derivative unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl.

In another aspect, $R^3$ is selected from C3-C8 cycloalkyl, C6-C10 aryl, C3-C9 heterocycloalkyl, and C5-C9 heteroaryl, being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl.

In one aspect, $R^{4a}$ is C1-C20 alkyl being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl. For example, $R^{4a}$ can be C1-C12. In another example, $R^{4a}$ can be C2-C5. In yet another example, $R^{4a}$ can be C2-C4.

In one aspect, $R^{4a}$ is selected from C1-C20 alkoxy, C1-C20 haloalkyl, cholesterol, cholesterol derivative, C3-C8 cycloalkyl, C6-C10 aryl, C3-C9 heterocycloalkyl, and C5-C9 heteroaryl, —OH, and

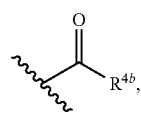

being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl. For example, $R^{4a}$ can be

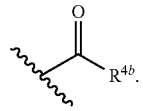

In one aspect, $R^{4a}$ is

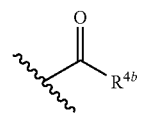

and $R^{4b}$ is C6-C10 aryl being unsubstituted or substituted with one or more groups independently selected from halogen, —CN, —NH$_2$, —OH, C1-C12 alkyl, C1-C12 haloalkyl, C1-C12 hydroxyalkyl, C1-C12 alkoxy, C1-C12 alkylamino, C3-C8 cycloalkyl, C6-C10 aryl, C3-C9 heterocycloalkyl, and C5-C9 heteroaryl. For example, $R^{4a}$ can be

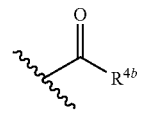

and $R^{4b}$ can be unsubstituted C6-C10 aryl.

In one aspect, each of $R^{5a}$, $R^{5b}$, $R^{5c}$, $R^{5d}$, and $R^{5e}$ is hydrogen. In another aspect, each of $R^{5a}$, $R^{5b}$, $R^{5c}$, $R^{5d}$, and $R^{5e}$ is independently selected from hydrogen and C1-C12 alkyl.

In one aspect, each of $R^{6a}$, $R^{6b}$, $R^{6c}$, and $R^{6d}$ is hydrogen. In another aspect, each of $R^{6a}$, $R^{6b}$, $R^{6c}$, and $R^{6d}$ is independently selected from hydrogen and C1-C12 alkyl. For example, $R^{6a}$ can be C1-C12 alkyl, such as C1 alkyl, and $R^{6b}$, $R^{6c}$, and $R^{6d}$ can be hydrogen.

In one aspect, each of $R^{7a}$, $R^{7b}$, $R^{7c}$, and $R^{7d}$ is hydrogen. In another asepct, each of $R^{7a}$, $R^{7b}$, $R^{7c}$, and $R^{7d}$ is independently selected from hydrogen and C1-C12 alkyl.

In one aspect, the one or more vinyl ether monomers has a structure:

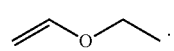

In one aspect, the one or more vinyl ether monomers has a structure:

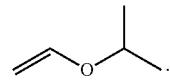

In one aspect, the one or more vinyl ether monomers has a structure:

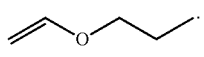

In one aspect, the one or more vinyl ether monomers has a structure:

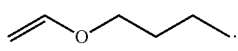

In one aspect, the one or more vinyl ether monomers has a structure:

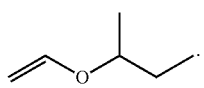

In one aspect, the one or more vinyl ether monomers has a structure:

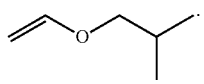

In one aspect, the one or more vinyl ether monomers has a structure:

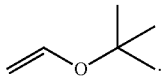

In one aspect, the one or more vinyl ether monomers has a structure:

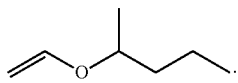

In one aspect, the one or more vinyl ether monomers has a structure:

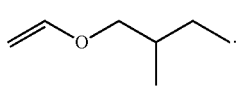

In one aspect, the one or more vinyl ether monomers has a structure:

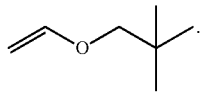

In one aspect, the one or more vinyl ether monomers has a structure:

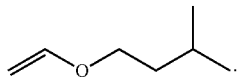

In one aspect, the one or more vinyl ether monomers has a structure:

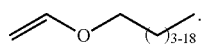

In one aspect, the one or more vinyl ether monomers has a structure:

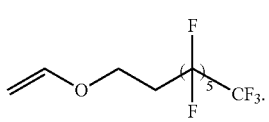

In one aspect, the one or more vinyl ether monomers has a structure:

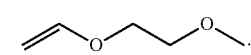

In one aspect, the one or more vinyl ether monomers has a structure:

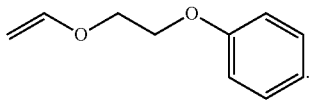

In one aspect, the one or more vinyl ether monomers has a structure:

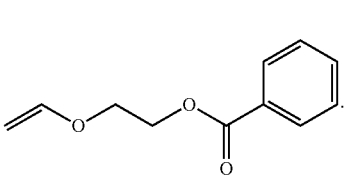

In one aspect, the one or more vinyl ether monomers has a structure:

In one aspect, the one or more vinyl ether monomers has a structure:

In one aspect, the one or more vinyl ether monomers has a structure:

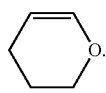

In one aspect, the one or more vinyl ether monomers has a structure:

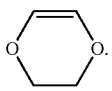

In one aspect, the one or more vinyl ether monomers has a structure:

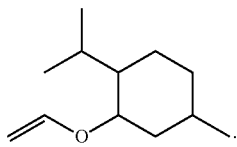

In one aspect, the one or more vinyl ether monomers has a structure:

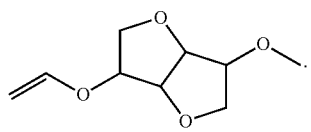

In one aspect, the one or more vinyl ether monomers has a structure:

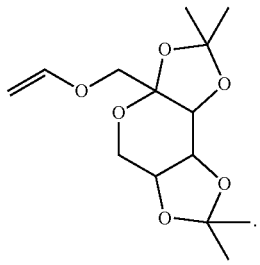 [SMILES: C=COCC12OCC3OC(C)(C)OC3C1OC(C)(C)O2]

In one aspect, the one or more vinyl ether monomers has a structure:

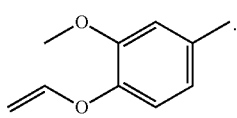

In one aspect, the one or more vinyl ether monomers has a structure:

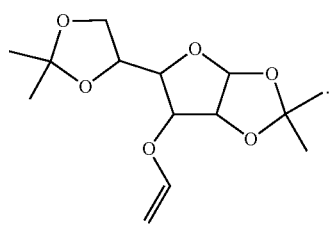

In one aspect, the one or more vinyl ether monomers has a structure:

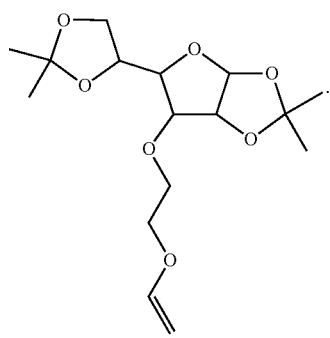

In one aspect, the one or more vinyl ether monomers has a structure:

In one aspect, the one or more vinyl ether monomers has a structure:

In one aspect, the one or more vinyl ether monomers has a structure:

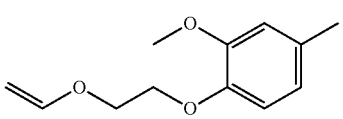

In one aspect, the one or more vinyl ether monomers has a structure:

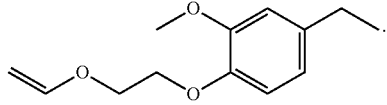 [SMILES: C=COCCOc1ccc(CC)cc1OC]

In one aspect, the one or more vinyl ether monomers has a structure:

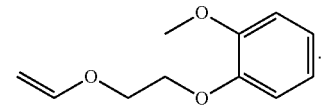

In one aspect, the one or more vinyl ether monomers has a structure:

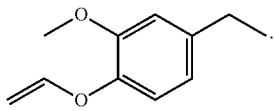

In one aspect, the one or more vinyl ether monomers has a structure:

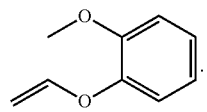

In one aspect, the one or more vinyl ether monomers has a structure:

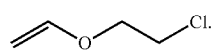

In one aspect, the one or more vinyl ether monomers has a structure:

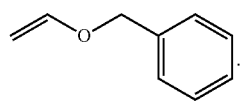

In one aspect, the one or more vinyl ether monomers has a structure:

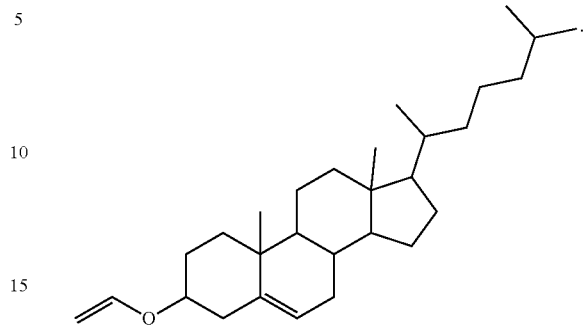

In one aspect, the one or more vinyl ether monomers has a structure:

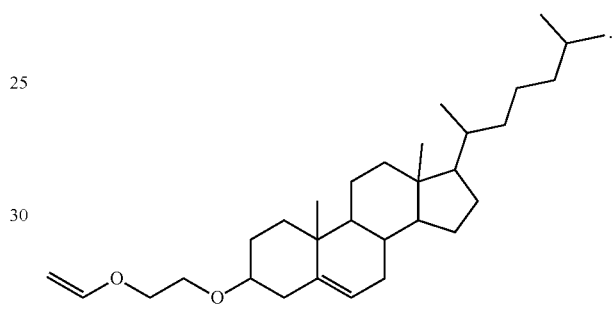

In one aspect, the one or more vinyl ether monomers has a structure:

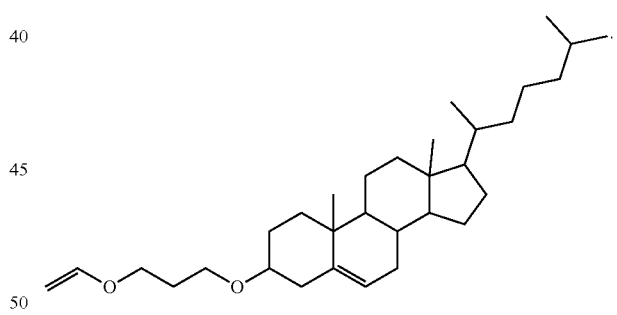

In one aspect, the one or more vinyl ether monomers has a structure:

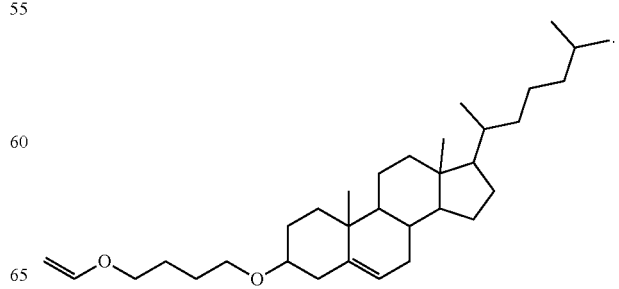

In one aspect, the Lewis acid additive comprises titanium tetrachloride, titanium tetrabromide, zinc dichloride, boron trichloride, boron trifluoride, tin tetrachloride, antimony pentachloride, scandium(III) trifluoromethanesulfonate, zirconium tetrachloride, aluminum trichloride, vanadium tetrachloride, iron trichloride, yttrium(III) trifluoromethanesulfonate, ytterbium(III) trifluoromethanesulfonate, alkylaluminum dichlorides, or dialkylaluminum chlorides. For example, the Lewis acid additive can comprise titanium tetrachloride. In another example, the Lewis acid additive can comprise titanium tetrabromide. In yet another example, the Lewis acid additive can comprise zinc dichloride. In yet another example, the Lewis acid additive can comprise boron trichloride. In yet another example, the Lewis acid additive can comprise boron trifluoride. In yet another example, the Lewis acid additive can comprise tin tetrachloride. In yet another example, the Lewis acid additive can comprise antimony pentachloride. In yet another example, the Lewis acid additive can comprise scandium(III) trifluoromethanesulfonate. In yet another example, the Lewis acid additive can comprise zirconium tetrachloride. In yet another example, the Lewis acid additive can comprise aluminum trichloride. In yet another example, the Lewis acid additive can comprise vanadium tetrachloride. In yet another example, the Lewis acid additive can comprise iron trichloride. In yet another example, the Lewis acid additive can comprise yttrium(III) trifluoromethanesulfonate. In yet another example, the Lewis acid additive can comprise ytterbium(III) trifluoromethanesulfonate. In yet another example, the Lewis acid additive can comprise alkylaluminum dichlorides. In yet another example, the Lewis acid additive can comprise dialkylaluminum chlorides.

In one aspect, the Lewis acid additive comprises a donor ligand complexed with titanium tetrachloride, titanium tetrabromide, zinc dichloride, boron trichloride, boron trifluoride, tin tetrachloride, antimony pentachloride, scandium (III) trifluoromethanesulfonate, zirconium tetrachloride, aluminum trichloride, vanadium tetrachloride, iron trichloride, yttrium(III) trifluoromethanesulfonate, ytterbium(III) trifluoromethanesulfonate, alkylaluminum dichlorides, or dialkylaluminum chlorides. For example, the Lewis acid additive can comprise a donor ligand complexed with titanium tetrachloride. In another example, the Lewis acid additive can comprise a donor ligand complexed with titanium tetrabromide. In yet another example, the Lewis acid additive can comprise a donor ligand complexed with zinc dichloride. In yet another example, the Lewis acid additive can comprise a donor ligand complexed with boron trichloride. In yet another example, the Lewis acid additive can comprise a donor ligand complexed with boron trifluoride. In yet another example, the Lewis acid additive can comprise a donor ligand complexed with tin tetrachloride. In yet another example, the Lewis acid additive can comprise a donor ligand complexed with antimony pentachloride. In yet another example, the Lewis acid additive can comprise a donor ligand complexed with scandium(III) trifluoromethanesulfonate. In yet another example, the Lewis acid additive can comprise a donor ligand complexed with zirconium tetrachloride. In yet another example, the Lewis acid additive can comprise a donor ligand complexed with aluminum trichloride. In yet another example, the Lewis acid additive can comprise a donor ligand complexed with vanadium tetrachloride. In yet another example, the Lewis acid additive can comprise a donor ligand complexed with iron trichloride. In yet another example, the Lewis acid additive can comprise a donor ligand complexed with yttrium(III) trifluoromethanesulfonate. In yet another example, the Lewis acid additive can comprise a donor ligand complexed with ytterbium(III) trifluoromethanesulfonate. In yet another example, the Lewis acid additive can comprise a donor ligand complexed with alkylaluminum dichlorides. In yet another example, the Lewis acid additive can comprise a donor ligand complexed with dialkylaluminum chlorides.

In one aspect, the donor ligand is selected from tetrahydrofuran, tetrahydrothiophene, tetrahydropyran, pyridine, dimethylaminopyridine, N-methylmorpholine, triethylamine, 2,6-lutidine, 2,3-lutidine, dioxane, diethyl ether, ethyl acetate, acetone, N-methylpyrrolidone, N,N-dimethylformamide, acetonitrile, dimethylsulfoxide, dimethylsulfide, and dibutylsulfide. For example, the donor ligand can be tetrahydrofuran. In another example, the donor ligand can be tetrahydrothiophene. In yet another example, the donor ligand can be tetrahydropyran. In yet another example, the donor ligand can be pyridine. In yet another example, the donor ligand can be dimethylaminopyridine. In yet another example, the donor ligand can be N-methylmorpholine. In yet another example, the donor ligand can be triethylamine. In yet another example, the donor ligand can be 2,6-lutidine. In yet another example, the donor ligand can be 2,3-lutidine dioxane. In yet another example, the donor ligand can be diethyl ether. In yet another example, the donor ligand can be ethyl acetate. In yet another example, the donor ligand can be acetone. In yet another example, the donor ligand can be N-methylpyrrolidone. In yet another example, the donor ligand can be N,N-dimethylformamide. In yet another example, the donor ligand can be acetonitrile. In yet another example, the donor ligand can be dimethylsulfoxide. In yet another example, the donor ligand can be dimethylsulfide. In yet another example, the donor ligand can be dibutylsulfide.

In various aspects, the methods disclosed herein produce a polymer having at least 60% m. For example, in a further aspect, the methods disclosed herein produce a polymer having at least 65% m. In a still further aspect, the methods disclosed herein produce a polymer having at least 70% m. In yet a further aspect, the methods disclosed herein produce a polymer having at least 75% m. In an even further aspect, the methods disclosed herein produce a polymer having at least 80% m. In a still further aspect, the methods disclosed herein produce a polymer having at least 85% m. In yet a further aspect, the methods disclosed herein produce a polymer having at least 90% m. In an even further aspect, the methods disclosed herein produce a polymer having at least 92% m. In a still further aspect, the methods disclosed herein produce a polymer having at least 95% m. In yet a further aspect, the methods disclosed herein produce a polymer having from 70% m to 95% m. In yet a further aspect, the methods disclosed herein produce a polymer having from 75% m to 95% m. In yet a further aspect, the methods disclosed herein produce a polymer having from 80% m to 95% m. In yet a further aspect, the methods disclosed herein produce a polymer having from 85% m to 95% m. In yet a further aspect, the methods disclosed herein produce a polymer having from 90% m to 95% m.

In various aspects, the methods disclosed herein produce a polymer formed from

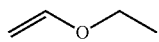

having at least 80% m. For example, in a further aspect, the methods disclosed herein produce a polymer formed from

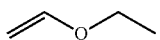

having at least 85% m. In a still further aspect, the methods disclosed herein produce a polymer formed from

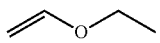

having at least 90% m. In yet still a further aspect the methods disclosed herein produce a polymer formed from

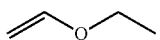

having from 90% m to 95% m.

In various aspects, the methods disclosed herein produce a polymer formed from

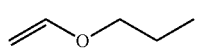

having at least 80% m. For example, in a further aspect, the methods disclosed herein produce a polymer formed from

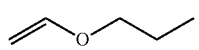

having at least 85% m. In a still further aspect, the methods disclosed herein produce a polymer formed from

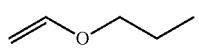

having at least 90% m. In yet still a further aspect, the methods disclosed herein produce a polymer formed from

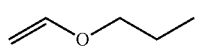

having from 90% m to 95% m.

In various aspects, the methods disclosed herein produce a polymer formed from

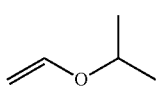

having at least 80% m. For example, in a further aspect, the methods disclosed herein produce a polymer formed from

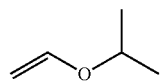

having at least 85% m. In a still further aspect, the methods disclosed herein produce a polymer formed from

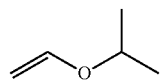

having at least 90% m. In yet still a further aspect, the methods disclosed herein produce a polymer formed from

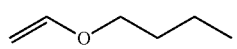

having from 85% m to 95% m.

In various aspects, the methods disclosed herein produce a polymer formed from

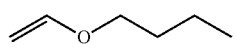

having at least 80% m. For example, in a further aspect, the methods disclosed herein produce a polymer formed from

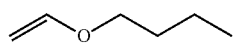

having at least 85% m. In a still further aspect, the methods disclosed herein produce a polymer formed from

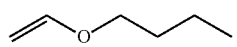

having at least 90% m. In yet still a further aspect, the methods disclosed herein produce a polymer formed from

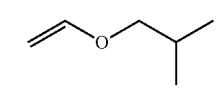

having from 90% m to 95% m.

In various aspects, the methods disclosed herein produce a polymer formed from

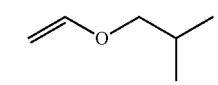

having at least 80% m. For example, in a further aspect, the methods disclosed herein produce a polymer formed from having at least 85% m. In a still further aspect, the methods disclosed herein produce a polymer formed from

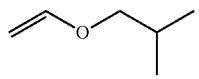

having at least 90% m. In yet still a further aspect, the methods disclosed herein produce a polymer formed from

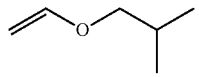

having from 90% m to 95% m.

In various aspects, the methods disclosed herein produce a polymer formed from

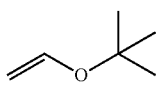

having at least 65% m. For example, in a further aspect, the methods disclosed herein produce a polymer formed from

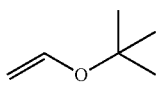

having at least 70% m. In yet still a further aspect, the methods disclosed herein produce a polymer formed from

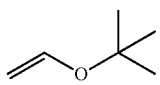

having from 70% m to 80% m.

In various aspects, the methods disclosed herein produce a polymer formed from

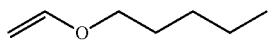

having at least 50% m. For example, in a further aspect, the methods disclosed herein produce a polymer formed from

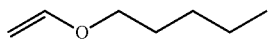

having at least 55% m. In a still further aspect, the methods disclosed herein produce a polymer formed from

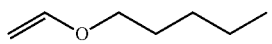

having at least 60% m. In a still further aspect, the methods disclosed herein produce a polymer formed from

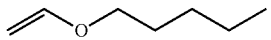

having at least 65% m. In a still further aspect, the methods disclosed herein produce a polymer formed from

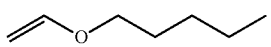

having at least 70% m. In a still further aspect the methods disclosed herein produce a polymer formed from

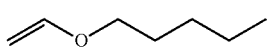

having at least 75% m. In a still further aspect, the methods disclosed herein produce a polymer formed from

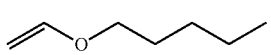

having at least 80% m. In a still further aspect the methods disclosed herein produce a polymer formed from

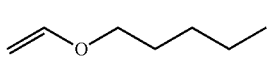

having at least 85% m. In a still further aspect, the methods disclosed herein produce a polymer formed from

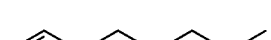

having at least 90% m. In yet still a further aspect, the methods disclosed herein produce a polymer formed from

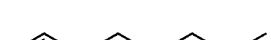

having from 50% m to 95% m. In yet still a further aspect, the methods disclosed herein produce a polymer formed from

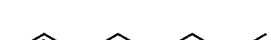

having from 60% m to 95% m. In yet still a further aspect the methods disclosed herein produce a polymer formed from

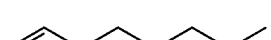

having from 70% m to 95% m. In yet still a further aspect, the methods disclosed herein produce a polymer formed from

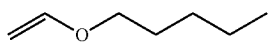

having from 80% m to 95% m. In yet still a further aspect, the methods disclosed herein produce a polymer formed from

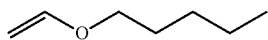

having from 85% m to 95% m. In yet still a further aspect, the methods disclosed herein produce a polymer formed from

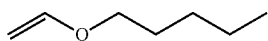

having from 90% m to 95% m.

Also disclosed is a polymer comprising repeating units formed from ethyl vinyl ether, wherein the polymer has a tacticity of at least 75% m. For example, the polymer comprising repeating units formed from ethyl vinyl ether can have a tacticity of at least 80% m. In another example, the polymer comprising repeating units formed from ethyl vinyl ether can have a tacticity of at least 85% m. In yet another example, the polymer comprising repeating units formed from ethyl vinyl ether can have a tacticity of at least 90% m. In yet another example, the polymer comprising repeating units formed from ethyl vinyl ether can have a tacticity from 90% m to 95% m.

Also disclosed is a polymer comprising repeating units formed from n-propyl vinyl ether, wherein the polymer has a tacticity of at least 79% m. For example, the polymer comprising repeating units formed from n-propyl vinyl ether can have a tacticity of at least 80% m. In another example, the polymer comprising repeating units formed from n-propyl vinyl ether can have a tacticity of at least 85% m. In yet another example, the polymer comprising repeating units formed from n-propyl vinyl ether can have a tacticity of at least 90% m. In yet another example, the polymer comprising repeating units formed from n-propyl vinyl ether can have a tacticity from 90% m to 95% m.

Also disclosed is a polymer comprising repeating units formed from iso-propyl vinyl ether, wherein the polymer has a tacticity of at least 89% m. For example, the polymer comprising repeating units formed from iso-propyl vinyl ether can have a tacticity of at least 80% m. In another example, the polymer comprising repeating units formed from iso-propyl vinyl ether can have a tacticity of at least 90% m. In yet another example, the polymer comprising repeating units formed from iso-propyl vinyl ether can have a tacticity from 90% m to 95% m.

Also disclosed is a polymer comprising repeating units formed from iso-amyl vinyl ether, wherein the polymer has a tacticity of at least 50% m. For example, the polymer comprising repeating units formed from iso-amyl vinyl ether can have a tacticity of at least 60% m. In another example, the polymer comprising repeating units formed from iso-amyl vinyl ether can have a tacticity of at least 70% m. In yet another example, the polymer comprising repeating units formed from iso-amyl vinyl ether can have a tacticity of at least 80% m. In yet another example, the polymer comprising repeating units formed from iso-amyl vinyl ether can have a tacticity of at least 85% m. In yet another example, the polymer comprising repeating units formed from iso-amyl vinyl ether can have a tacticity of at least 90% m. In yet another example, the polymer comprising repeating units formed from iso-amyl vinyl ether can have a tacticity from 90% m to 95% m.

In one aspect, the formed polymers by the methods disclosed herein or polymers disclosed herein have an $M_n$ of at least 5 kg/mol. For example, the formed polymers by the methods disclosed herein or polymers disclosed herein have an $M_n$ of at least 10 kg/mol. In another example, the formed polymers by the methods disclosed herein or polymers disclosed herein have an $M_n$ of at least 20 kg/mol. In yet another example, the formed polymers by the methods disclosed herein or polymers disclosed herein have an $M_n$ of at least 30 kg/mol. In yet another example, the formed polymers by the methods disclosed herein or polymers disclosed herein have an $M_n$ of at least 40 kg/mol. In yet another example, the formed polymers by the methods disclosed herein or polymers disclosed herein have an $M_n$ of at least 50 kg/mol. In yet another example, the formed polymers by the methods disclosed herein or polymers disclosed herein have an $M_n$ of at least 60 kg/mol. In yet another example, the formed polymers by the methods disclosed herein or polymers disclosed herein have an $M_n$ of at least 70 kg/mol. In yet another example, the formed polymers by the methods disclosed herein or polymers disclosed herein have an $M_n$ of at least 80 kg/mol. In yet another example, the formed polymers by the methods disclosed herein or polymers disclosed herein have an $M_n$ of at least 90 kg/mol. In yet another example, the formed polymers by the methods disclosed herein or polymers disclosed herein have an $M_n$ of at least 100 kg/mol. In yet another example, the formed polymers by the methods disclosed herein or polymers disclosed herein have an $M_n$ of at least 110 kg/mol. In yet another example, the formed polymers by the methods disclosed herein or polymers disclosed herein have an $M_n$ of at least 120 kg/mol. In yet another example, the formed polymers by the methods disclosed herein or polymers disclosed herein have an $M_n$ of at least 130 kg/mol. In yet another example, the formed polymers by the methods disclosed herein or polymers disclosed herein have an $M_n$ of at least 140 kg/mol. In yet another example, the formed polymers by the methods disclosed herein or polymers disclosed herein have an $M_n$ of at least 150 kg/mol. In yet another example, the formed polymers by the methods disclosed herein or polymers disclosed herein have an $M_n$ of at least 160 kg/mol. In yet another example, the formed polymers by the methods disclosed herein or polymers disclosed herein have an $M_n$ of at least 170 kg/mol. In yet another example, the formed polymers by the methods disclosed herein or polymers disclosed herein have an $M_n$ of at least 180 kg/mol. In yet another example, the formed polymers by the methods disclosed herein or polymers disclosed herein have an $M_n$ of at least 190 kg/mol. In yet another example, the formed polymers by the methods disclosed herein or polymers disclosed herein have an $M_n$ of at least 200 kg/mol. In yet another example, the formed polymers by the methods disclosed herein or polymers disclosed herein have an $M_n$ of at least 250 kg/mol. In yet another example, the formed polymers by the methods disclosed herein or polymers disclosed herein have an $M_n$ of at least 300 kg/mol. In yet another example, the formed polymers by the methods disclosed herein or polymers disclosed herein have an $M_a$ from 10 to 200 kg/mol. In yet another example, the formed polymers by the methods disclosed herein or polymers disclosed herein have an $M_a$ from 50 to 200 kg/mol. In yet another example, the formed polymers by the methods disclosed herein or polymers disclosed herein have an $M_a$ from 50 to 100 kg/mol. In yet another example, the formed polymers by the methods disclosed herein or polymers disclosed herein have an $M_n$ from 100 to 200 kg/mol.

In one aspect, the disclosed polymers are semicrystalline polymer materials. In one aspect, the disclosed polymers produced by the methods disclosed herein are semicrystalline polymer materials.

C. EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Figure 4:
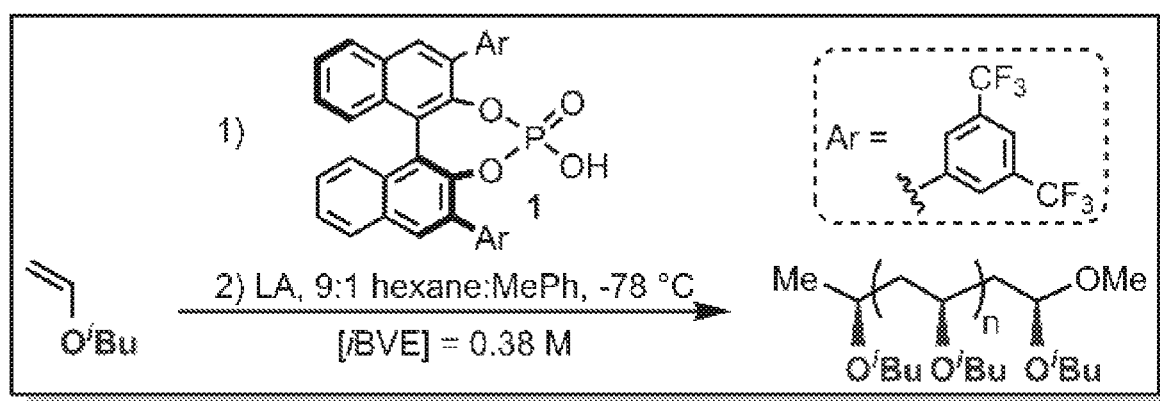
FIG. 4 shows polymerization of PVEs.

Cationic polymerization conditions for iBVE in the presence of a BINOL-based phosphoric acid was evaluated. iBVE was exposed to chiral acid 1, shown in FIG. 4, which has demonstrated success in mediating enantioselective additions to oxocarbenium reactive intermediates (Tay, *J. Am. Chem. Soc.* 139, 8570-8578 (2017), Sun, *Angew. Chem. Int. Ed.* 53, 11194-11198 (2014)). No polymerization was observed, likely due to the stability of the formed Markovnikov addition product. Lewis acid additives can promote oxocarbenium formation (Kamigaito, *Macromolecules* 26, 1643-1649 (1993)). It was shown that $TiCl_4$ can increase the isotacticity, with regard to % m (see FIG. 4). The addition of $TiCl_4$ to a mixture of iBVE and 1 at −78° C. resulted in nearly instantaneous polymerization to afford a relatively disperse material ($M_n$=46 kg/mol, Đ=2.1). Integration of the $^{13}C$ NMR backbone methylene resonances (δ 39-42 ppm, $CDCl_3$) revealed a 82% m, a significant improvement over an analogous reaction run with HCl in place of 1 (73% m).

Figure 5:
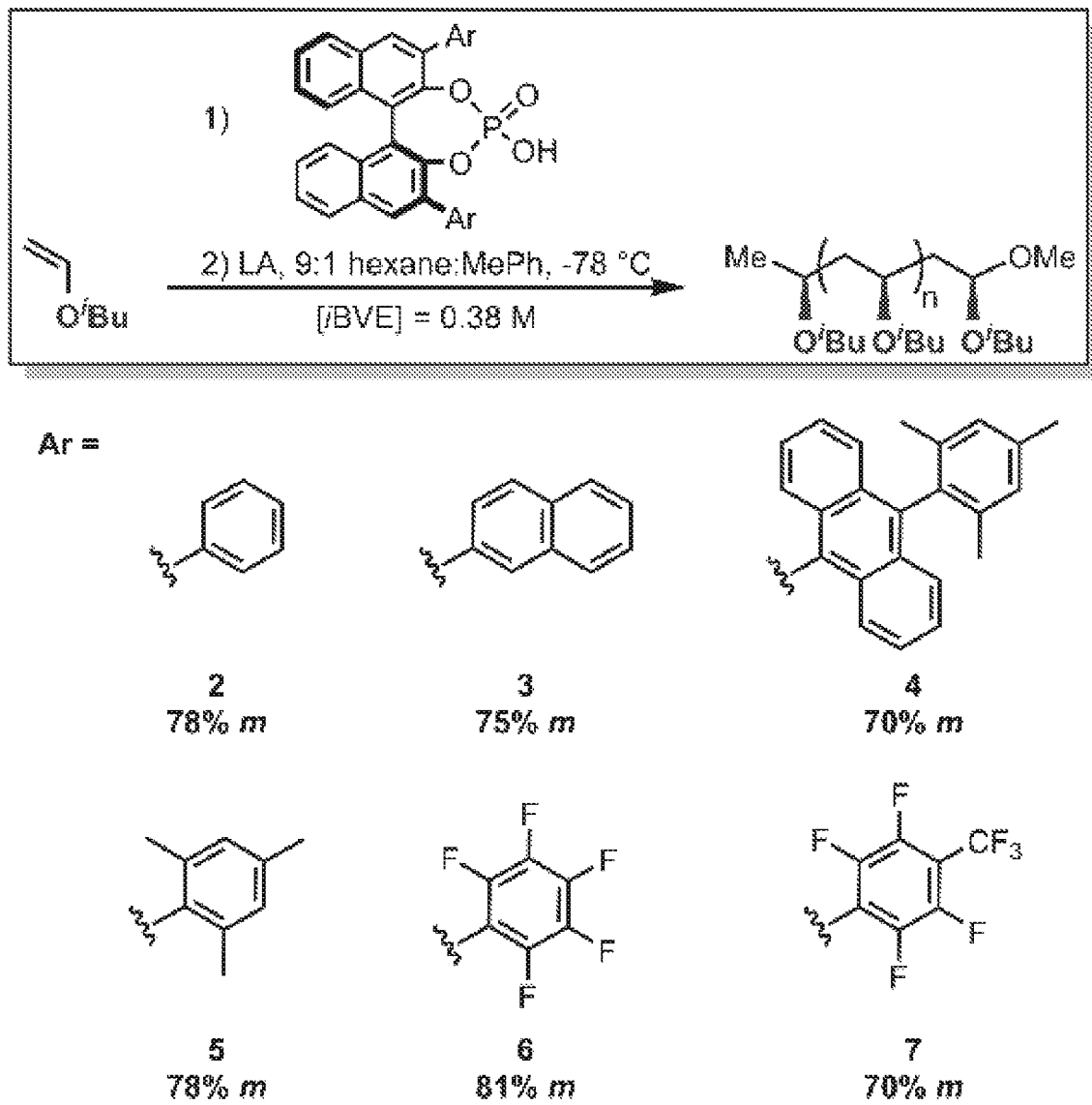
FIG. 5 shows polymerization of PVEs.

The steric and electronic effects of the acid on the polymerization was evaluated by a library of phosphoric acids with aryl groups featuring various steric and electronic environments. With the exception of the sterically hindered TRIP (Akiyama, *Synlett* 2006, 0141-0143 (2006); Hoffmann, Catalytic Asymmetric Reductive Amination of Aldehydes via Dynamic Kinetic Resolution (2006)), all phosphoric acid derivatives produced polymer when subjected to the reaction conditions described above, see FIG. 5.

Moving from the 3,5-bis(trifluoromethyl)aryl group in 1 to a simple phenyl substituent (2) resulted in a material with decreased isotacticity (78% m). Increasing the number of fused rings (i.e., 3 and 4) or adjusting the steric environment by incorporating mesityl groups (5) had little effect on % m; however, the introduction of perfluorophenyl groups (6) resulted in a degree of stereocontrol approaching that of 1. The addition of a trifluoromethyl group at the para position (7) had deleterious effects on stereocontrol.

Figure 6:
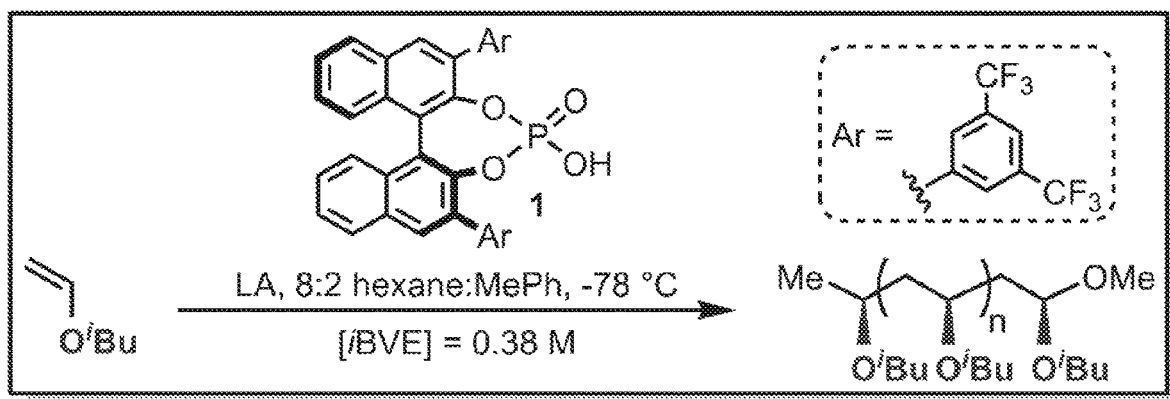
FIG. 6 shows polymerization of PVEs.

After screening a multitude of Lewis acid additives with Brønsted acid 1, including those with variable degrees of Lewis acidity and relative size, $TiCl_4(THF)_2$ was found to increase isotacticty the most. Utilizing the bis-THF complex $(TiCl_4(THF)_2)$ in place of native $TiCl_4$ was found to increase the isotacticity of the resultant polymers from 82% to 87% m. Additionally, a nearly universal increase in stereocontrol was observed by first mixing phosphoric acid and Lewis acid prior to addition to a monomer solution, producing 93% m poly(iBVE) when a combination of 1 and $TiCl_4(THF)_2$ was used, see FIG. 6. Poly(iBVE) with 93% meso diads were produced.

Figure 7:
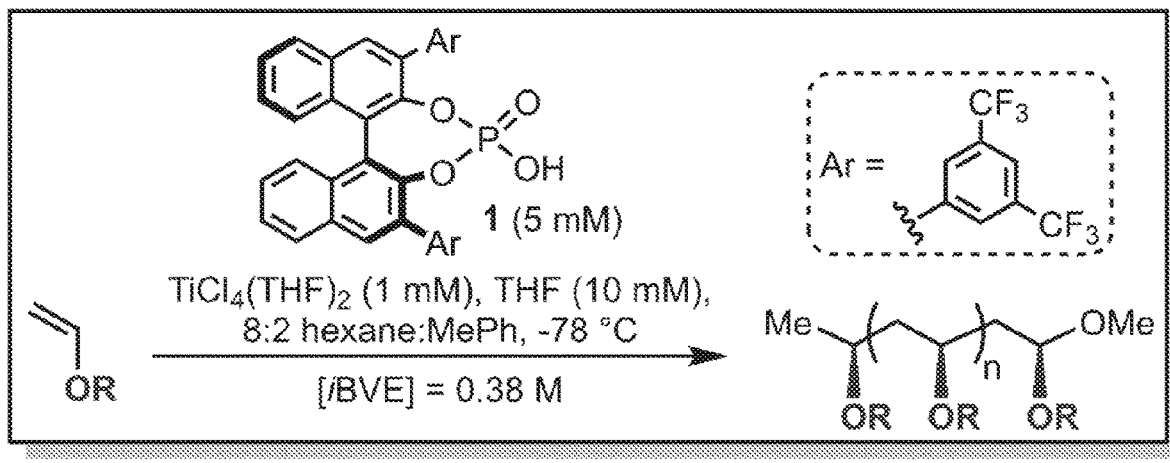
FIG. 7 shows polymerization of PVEs.

In addition to demonstrating stereocontrolled polymerization of IBVE using a synergistic combination of 1 and $TiCl_4(THF)_2$, it was shown that the class of alkyl vinyl ether monomers could be polymerized with high isotacticity. As shown in FIG. 7, iso-PVEs with a variety of alkyl substituents can be prepared without altering the established reaction conditions. The greatest degree of stereoinduction was observed for monomers with linear alkyl substituents, such as ethyl (EVE, 92% m), propyl (PVE, 92% m), and n-butyl (BVE, 93% m). Branched alkyl substituents, such as iBVE (93% m) were well tolerated; however, introduction of steric bulk at the carbon adjacent to the oxygen atom resulted in a decrease in isotacticity that was slight in the case of isopropyl (iPVE, 88% m) and more pronounced in the case of tert-butyl (tBVE, 75% m). The methods disclosed herein produced isotactic-rich materials across the spectrum of vinyl monomers explored.

Figure 8:
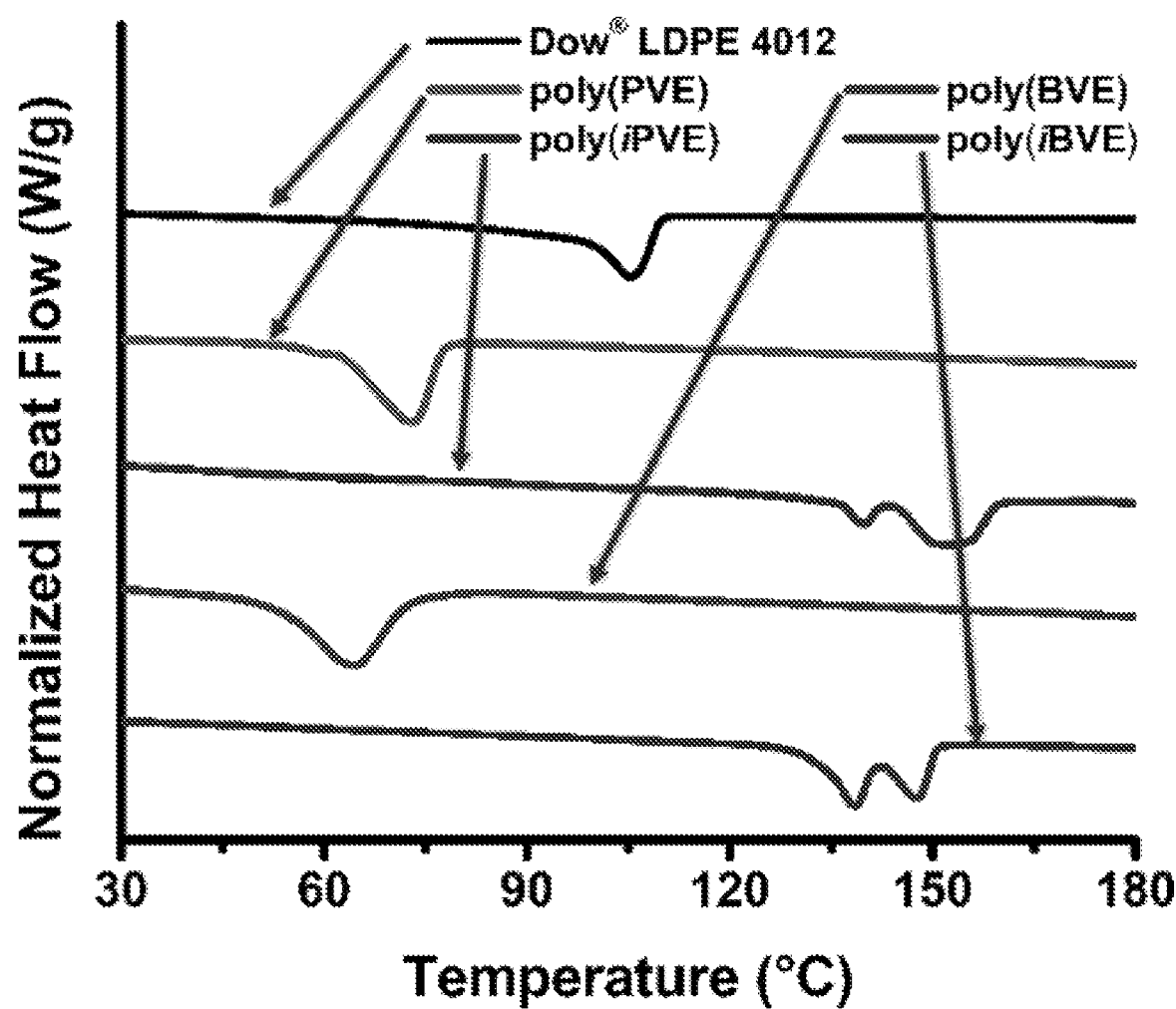
FIG. 8 shows results from differential scanning calorimetry of PVEs.

The thermal stability of the obtained iso-PVEs was evaluated using thermogravimetric analysis (TGA) and relative derivative thermogravimetry (DTG). All of the obtained iso-PVEs were thermally robust, with decomposition onset temperatures $T_d$ (temperature at 5% weight loss) greater than 325° C. and maximum decomposition temperatures $T_{max}$ (temperature at peak DTG value) greater than 392° C. Isotactic PVEs were further evaluated using differential scanning calorimetry (DSC). With the exception of poly (EVE) the obtained DSC chromatograms (FIG. 8) revealed semi-crystalline polymers with a wide range of glass-transition ($T_g$) and melting temperatures ($T_m$). All of the obtained PVEs featured $T_g$ values well below room temperature, with limits defined by poly(nPVE) ($T_g$=−53° C.) and poly(iPVE) ($T_g$=−14° C.). Notably, iso-PVEs with linear side chains (i.e., Pr, Bu) featured single melting transitions that ranged from 65-73° C., while PVEs with branched side chains (i.e., iPr, iBu) featured relatively high $T_m$s that manifested as two separate first-order transitions and ranged from 138-152° C. The appearance of multiple melting transitions is characteristic of many semi-crystalline homopolymers and likely related to a melting and subsequent recrystallization phenomenon of an initial crystal morphology during the heating scan. (Blundell, *Polymer* 28, 2248-2251 (1987); Paukkeri, *Polymer* 34, 4083-4088 (1993); Zhang, *Eur. Polym. J.* 39, 2315-2322 (2003)).

Figure 9A:
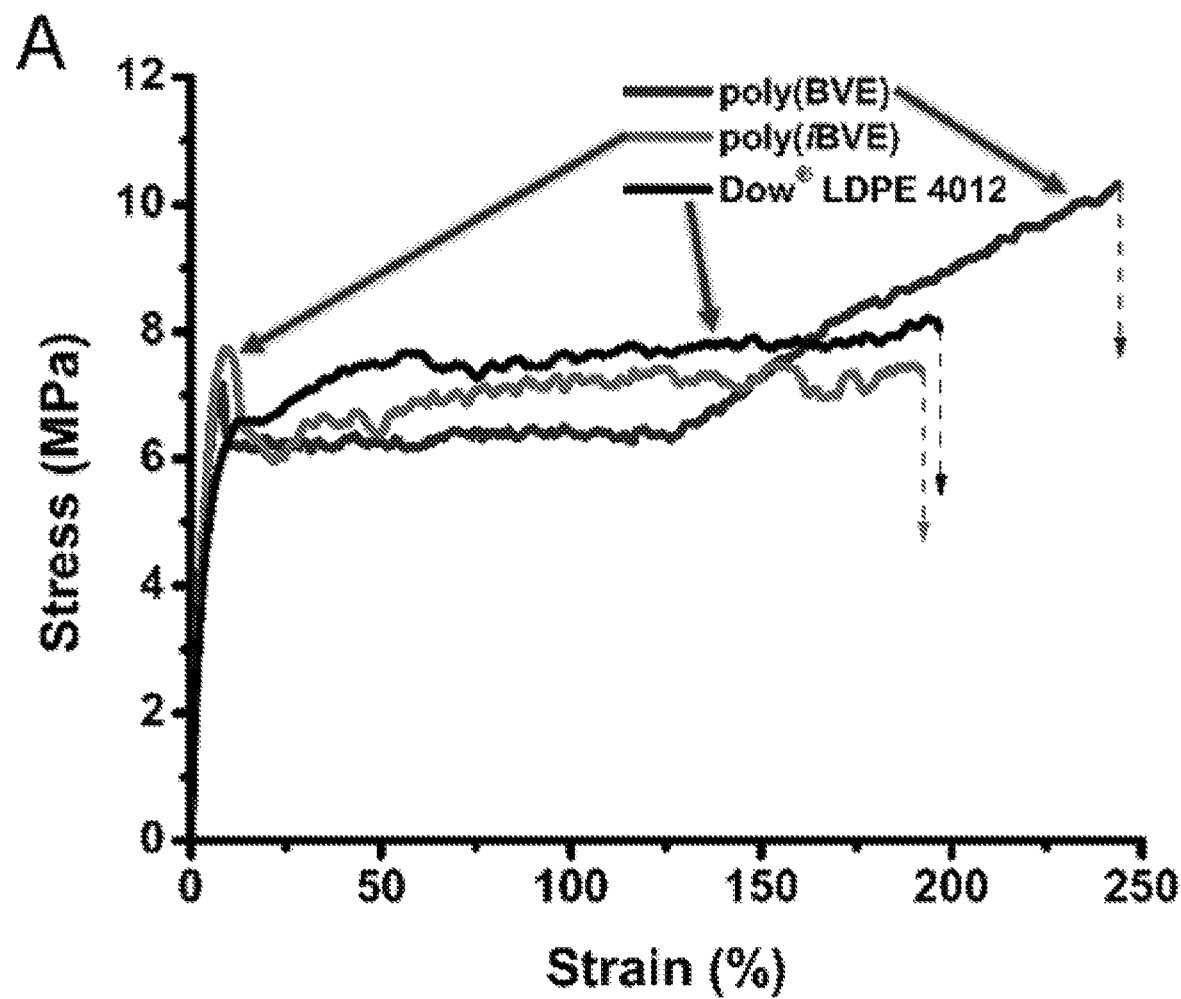
FIG. 9A shows stress-strain curves of poly(BVE), poly(iBVE), and LDPE measured by tensile testing at room temperature (5 mm/min).

The mechanical properties were evaluated by dynamic mechanical analysis (DMA) in linear film tension mode. Tensile testing of dog-bone-shaped specimens cut from melt-pressed films of poly(BVE) and poly(iBVE) yielded stress-strain curves (see FIG. 9A) that show deformation behavior typical of semi-crystalline thermoplastics (W. Brostow, R. P. Singh, in *Encyclopedia of Polymer Science and Technology* (John Wiley & Sons, Inc., Hoboken, N.J., USA, 2004)). A similar Young's modulus (E) was observed for both poly(nBVE) (E=160±30 MPa) and poly(iBVE) (E=200±20 MPa), while the yield strength ($\sigma_y$) of poly (iBVE) ($\sigma_y$=8.4±0.5 MPa) was slightly higher than that of poly(nBVE) ($\sigma_y$=6.5±0.5 MPa). The elongation at break value of poly(nBVE) ($\varepsilon_B$=260±20%) was relatively large compared to poly(iBVE) ($\varepsilon_B$=170±20%). However, significant degree of strain-stiffening was observed in films of poly(BVE), resulting in a greater tensile strength ($\sigma_b$=9.8±0.7 MPa) than that measured for poly(iBVE) ($\sigma_b$=8.2±0.5 MPa). Overall, the critical thermomechanical properties of both poly(nBVE) and poly(iBVE) compare well to commercial polyolefins, such as the low-density polyethylene Dow™ LDPE 4012 ($T_m$=105° C., E=280±40 MPa, $\sigma_y$=8±1 MPa, $\sigma_b$=10±2 MPa).

Figure 9B:
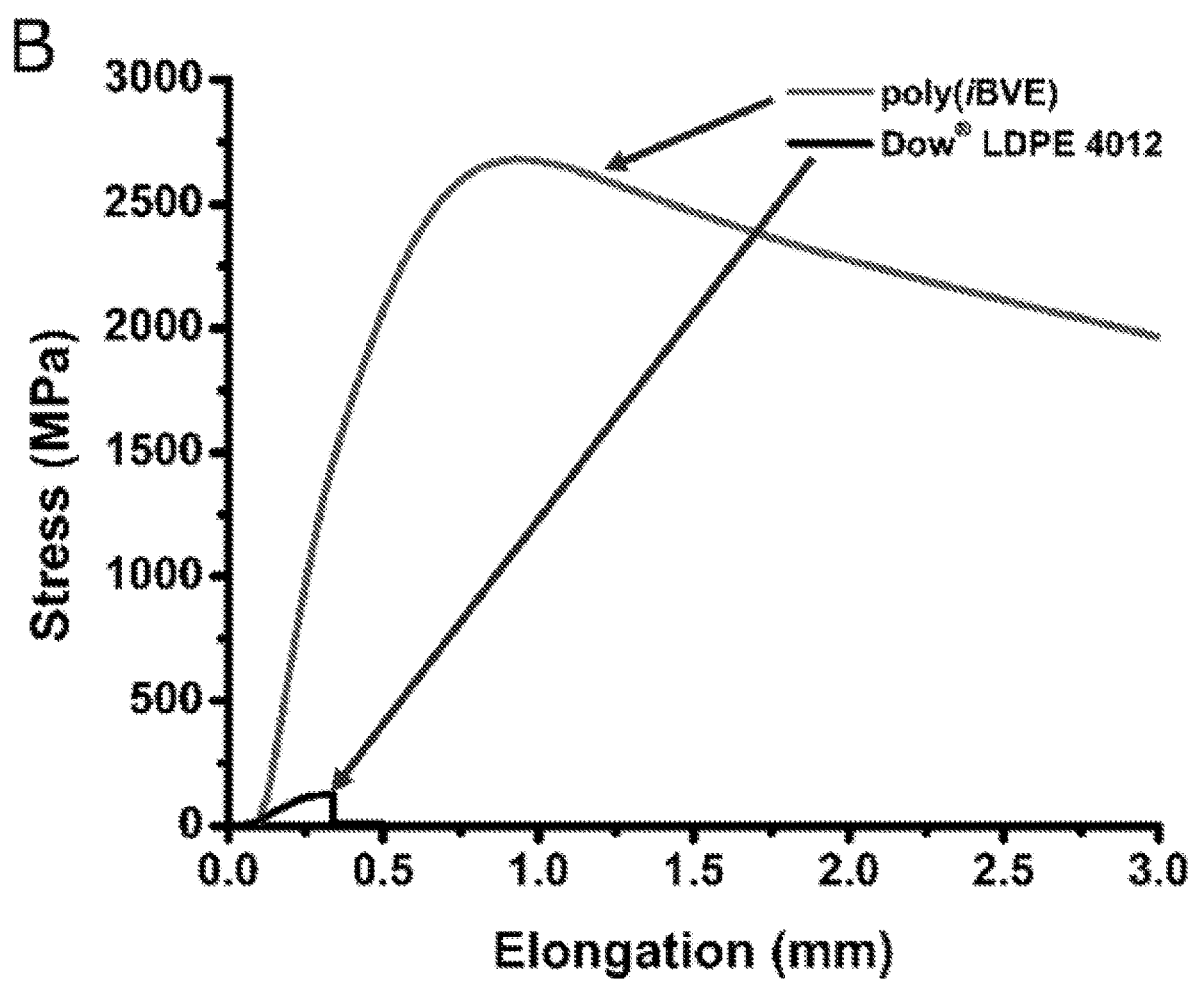
FIG. 9B shows lap shear results for poly(iBVE) and LDPE.
Figure 9C:
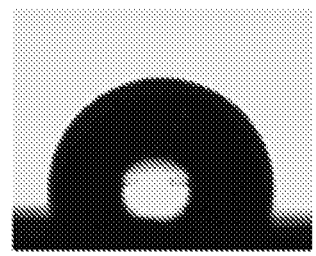
FIG. 9C shows contact angle measurements take from films of LLDPE and poly(iBVE).
Figure 9C:
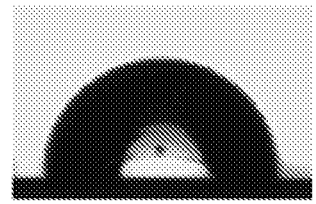

The surface properties of these iso-PVEs were evaluated. In addition to having thermomechanical properties commensurate with that of commercial polyolefin materials (i.e., LDPE), iso-PVEs has different surface properties due to their relatively high polarity. The contact angle of water on films of poly(iBVE) was measured to establish the relative hydrophilicity obtained due to the ether functionality in each repeat unit, see FIG. 9C. When compared to commercial polyolefins such as HDPE (105.3±0.4°) and LLDPE (104.0±0.5°), poly(iBVE) displayed a lower contact angle of 93.1±0.4°. Thus, poly(iBVE) could display superior adhesion to polar surfaces (i.e., glass) relative to commercial polyolefin materials. A single-lap joint between two glass slides that were pre-treated with piranha solution was prepared using poly(iBVE) or Dow™ LDPE 4012 and subjected to lap shear analysis using an Instron® 5566 Universal Testing System (see ESI). Significantly, poly(iBVE) demonstrated over 21 times stronger adhesion to glass than the Dow™ LDPE material, with apparent lap shear strength>2800 MPa and 120 MPa, respectively, see FIG. 9B. Collectively, these results demonstrate the impact that the ether functionality has on the adhesion of these materials to polar surfaces compared to hydrophobic polyolefins.

Figure 10:
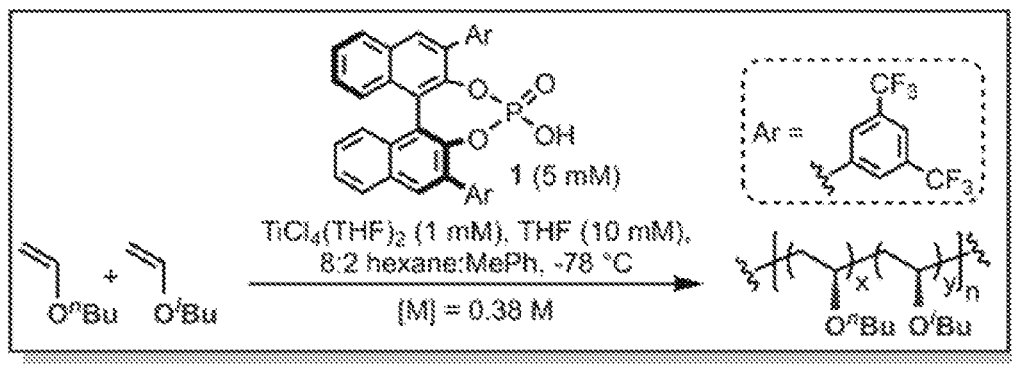
FIG. 10 shows polymerization of copolymer PVEs.

A range of random copolymers from BVE and iBVE were also prepared, see FIG. 10. The resulting poly(BVE-r-iBVE) materials display tunable $T_g$s, $T_m$s, and crystallization temperatures ($T_c$s) that are proportional to the relative incorporation of each monomer.

Figure 11:
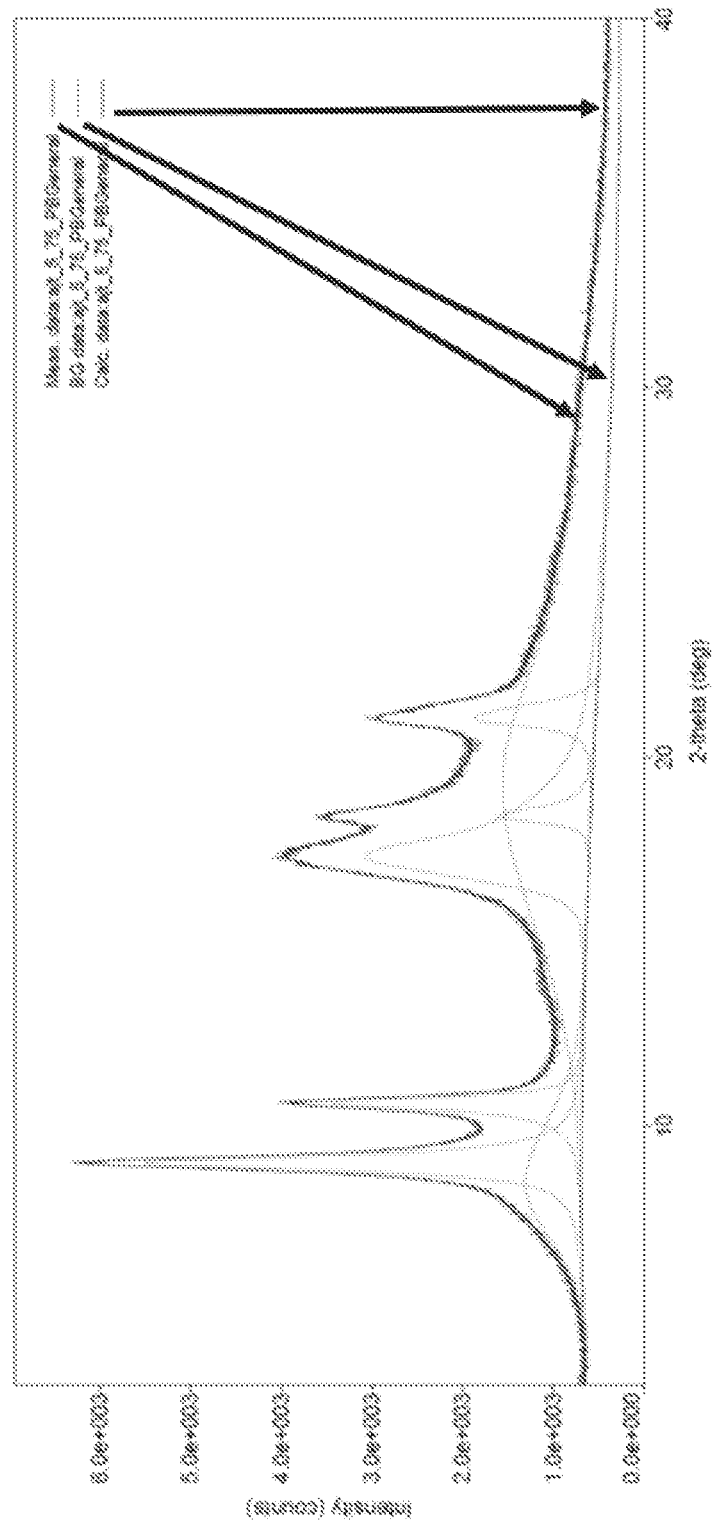
FIG. 11 shows wide-angle X-ray Scattering measurements of PVEs.

Wide-angle X-ray Scattering (WAXS) measurements were performed on the copolymers of isoPVEs obtained with this methodology to probe crystallinity. A representative X-ray diffraction pattern obtained for the copolymer poly(iBVE) using WAXS is shown in FIG. 11.

Figure 12:
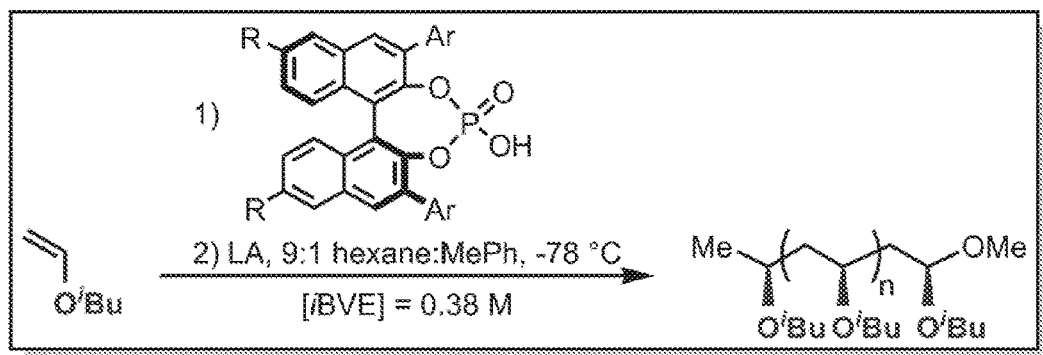
FIG. 12 shows polymerization of PVEs.
Figure 12:
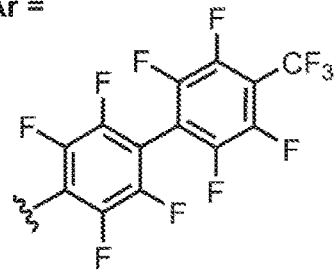
Figure 12:
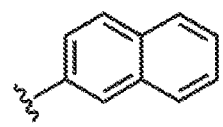
Figure 12:
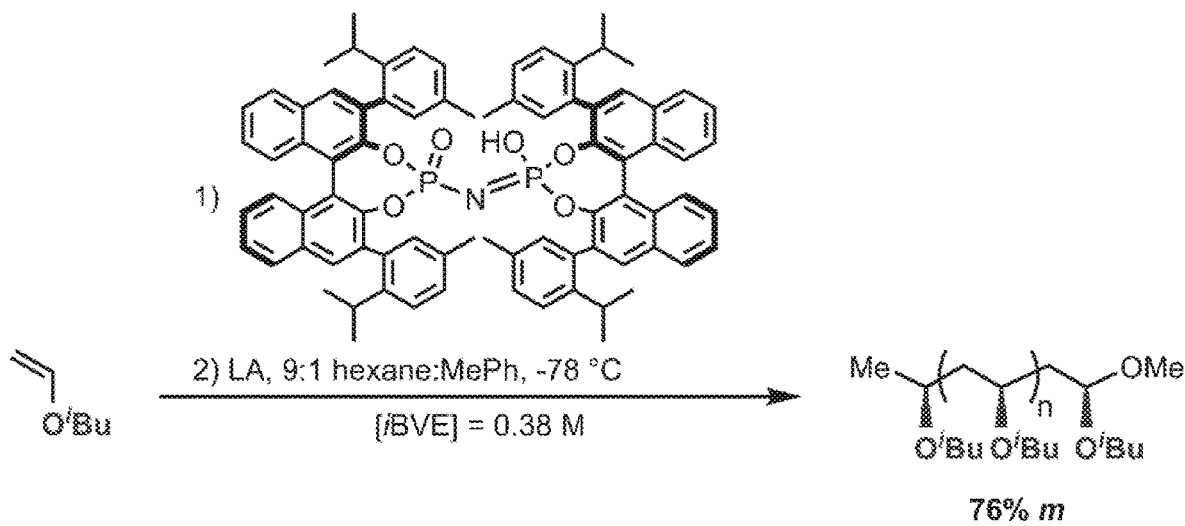

Additional polymers were made with various catalysts, as shown in FIG. 12.

Figure 13:
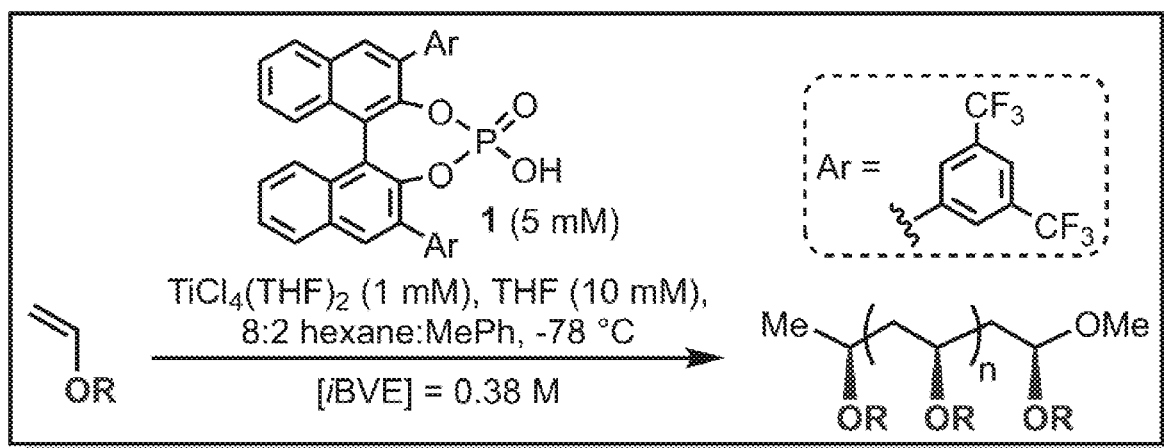
FIG. 13 shows polymerization of PVEs.

Additional polymers were made with altering the catalyst stereochemistry, as shown in FIG. 13.

A universal method for controlling stereochemistry in the cationic polymerization of vinyl ethers, and thus iso-PVEs, addresses a longstanding challenge in the polymer science community. Perhaps most importantly, this methodology represents a novel approach toward functional thermoplastics by incorporating a polar function group in each repeat unit without compromising the desirable thermomechanical properties typically associated with polyolefins. We anticipate facile access to an entire class of polar semi-crystalline thermoplastics will enable the realization of new materials with valuable applications that are not currently available using polyolefins.

D. REFERENCES

T. J. Hutley, M. Ouederni, in *Polyolefin Compounds and Materials: Fundamentals and Industrial Applications*, I. Al-Ali AlMa'adeed, M., Krupa, Ed. (Springer International Publishing, Chain, 2016), pp. 13-50.

N. M. G. Franssen, J. N. H. Reek, B. de Bruin, Synthesis of functional 'polyolefins': state of the art and remaining challenges. *Chem. Soc. Rev.* 42, 5809 (2013).

S. Ito, K. Nozaki, Coordination-insertion copolymerization of polar vinyl monomers by palladium catalysts. *Chem. Rec.* 10, 315-325 (2010).

S. D. Ittel, L. K. Johnson, M. Brookhart, Late-Metal Catalysts for Ethylene Homo- and Copolymerization. *Chem. Rev.* 100, 1169-1204 (2000).

B. Elvers, Ed., *Ullmann's Polymers and Plastics* (Wiley-VCH, Weinheim, 2016).

T. C. Chung, Synthesis of functional polyolefin copolymers with graft and block structures. *Prog. Polym. Sci.* 27, 39-85 (2002).

G. J. Domski, J. M. Rose, G. W. Coates, A. D. Bolig, M. Brookhart, Living alkene polymerization: New methods for the precision synthesis of polyolefins. *Prog. Polym. Sci.* 32, 30-92 (2007).

B. P. Carrow, K. Nozaki, Transition-Metal-Catalyzed Functional Polyolefin Synthesis: Effecting Control through Chelating Ancillary Ligand Design and Mechanistic Insights. *Macromolecules* 47, 2541-2555 (2014).

A. Nakamura et al., Ortho-Phosphinobenzenesulfonate: A Superb Ligand for Palladium-Catalyzed Coordination-Insertion Copolymerization of Polar Vinyl Monomers. *Acc. Chem. Res.* 46, 1438-1449 (2013).

W. Zhang et al., Electron-Rich Metal Cations Enable Synthesis of High Molecular Weight, Linear Functional Polyethylenes. *J. Am. Chem. Soc.* 140, 8841-8850 (2018).

P. Kenyon, M. Wörner, S. Mecking, Controlled Polymerization in Polar Solvents to Ultrahigh Molecular Weight Polyethylene. *J. Am. Chem. Soc.* 140, 6685-6689 (2018).

N. K. Boaen, M. A. Hillmyer, Post-polymerization functionalization of polyolefins. *Chem. Soc. Rev.* 34, 267 (2005).

G. Moad, The synthesis of polyolefin graft copolymers by reactive extrusion. *Prog. Polym. Sci.* 24, 81-142 (1999).

P. Gloor, Y. Tang, A. Kostanska, A. Hamielec, Chemical modification of polyolefins by free radical mechanisms: a modelling and experimental study of simultaneous random scission, branching and crosslinking. *Polymer* 35, 1012-1030 (1994).

M. Zhang et al., Synthesis and Characterization of Maleic Anhydride Grafted Polypropylene with a Well-Defined Molecular Structure. *Macromolecules* 46, 4313-4323 (2013).

Yuichiro Kondo et al., Rhodium-Catalyzed, Regiospecific Functionalization of Polyolefins in the Melt. *J Am. Chem. Soc.* 124, 1164-1165 (2002).

C. Bae et al., Regiospecific Side-Chain Functionalization of Linear Low-Density Polyethylene with Polar Groups. *Angew. Chem. Int. Ed.* 44, 6410-6413 (2005).

A. Bunescu, S. Lee, Q. Li, J. F. Hartwig, Catalytic Hydroxylation of Polyethylenes. *ACS Cent. Sci.* 3, 895-903 (2017).

M. Mar Diaz-Requejo et al., Controlled, Copper-Catalyzed Functionalization of Polyolefins. *Macromolecules* 38, 4966-4969 (2005).

A. Ray et al., Dehydrogenation of aliphatic polyolefins catalyzed by pincer-ligated iridium complexes. *Chem. Commun.*, 3388 (2005).

J. B. Williamson, W. L. Czaplyski, E. J. Alexanian, F. A. Leibfarth, Regioselective C—H Xanthylation as a Platform for Polyolefin Functionalization. *Angew. Chem. Int. Ed.* 57, 6261-6265 (2018).

G. Schröder, Poly(Vinyl Ethers). Ullmann's Encycl. Ind. Chem. 28, 481-485 (2000).

G. Natta et al., CRYSTALLINE HIGH POLYMERS OF α-OLEFINS. *J. Am. Chem. Soc.* 77, 1708-1710 (1955).

C. E. Schildknecht, A. O. Zoss, C. McKinley, Vinyl Alkyl Ethers. *Ind. Eng. Chem.* 39, 180-186 (1947).

C. E. Schildknecht, S. T. Gross, H. R. Davidson, J. M. Lambert, A. O. Zoss, Polyvinyl Isobutyll Ethers. *Ind. Eng. Chem.* 40, 2104-2115 (1948).

L. Fishbein, B. F. Crowe, The relation of structure to some physical and mechanical properties of poly(vinyl alkyl ethers). *Die Makromol. Chemie* 48, 221-228 (1961).

G. Natta et al., Isomorphism Phenomena in Isotactic Poly (4-methyl-substituted α-olefins) and in Isotactic Poly (alkyl vinyl ethers). *Macromolecules* 2, 311-315 (1969).

G. Natta, I. W. Bassi, G. Allegra, Studies on the molecular conformations of racemic poly(sec-butyl) vinyl ether of poly-s-(sec-butyl) vinyl ether, and of polyisopropyl vinyl ether in the crystal state. *Die Makromol. Chemie* 89, 81-94 (1965).

V. G. Natta, I. Bassi, P. Corradini, Uber die kettenstruktur des kristallinen polyvinylisobutylathers. *Die Makromol. Chemie* 18, 455-462 (1956).

G. Natta, G. Dall'Asta, G. Mazzanti, U. Giannini, S. Cesca, Stereospezifische Polymerisation von Vinylathern. *Angew. Chem.* 71, 205-210 (1959).

C. E. Schildknecht, C. H. Lee, K. P. Long, L. C. Rinehart, Some Aspects of Polymer Morphology: Time Dependence in Morphology of Polyvinyl Ethers and Polypropylenes. *Polym. Eng. Sci.* 7, 257-263 (1967).

K. Hatada, T. Kitayama, N. Matsuo, H. Yuki, C-13 NMR Spectra and Spin-Lattice Relaxation Times of Poly(alkyl vinyl ether)s. *Polym. J.* 15 (1983), pp. 719-725.

K. E. I. Matsuzaki, H. Ito, T. Kawariura, T. Uryu, Nuclear Magnetic Resonance Studies on the Stereochemical Configurations of 2,4-Dimethoxypentane and Poly (alkyl Vinyl Ethers). *J. Polym. Sci. A Polym. Chem.* 11, 971-987 (1973).

S. Aoshima, Y. Ito, E. Kobayashi, Stereoregularity of Poly (vinyl ether)s with a Narrow Molecular Weight Distribution Obtained by the Living Cationic Polymerization. *Polym. J.* 25 (1993), pp. 1161-1168.

R. Ohgi H, Sato T, Highly isotactic poly (vinyl alcohol). III: Heterogeneous cationic polymerization of tert-butyl vinyl ether. *Polymer* 43, 3826-3836 (2002).

T. Kawaguchi, F. Sanda, T. Masuda, Polymerization of vinyl ethers with transition-metal catalysts: An examination of the stereoregularity of the formed polymers. *J. Polym. Sci. A Polym. Chem.* 40, 3938-3943 (2002).

Q. Huang, Y. Wu, J. Dan, Cationic polymerization of isobutyl vinyl ether coinitiated with heteropolyacid or its salts in aqueous medium. *J Polym. Sci. A Polym. Chem.* 51, 546-556 (2013).

G. W. Coates, Precise Control of Polyolefin Stereochemistry Using Single-Site Metal Catalysts. *Chem. Rev.* 100, 1223-1252 (2000).

M. Sawamoto, Modem cationic vinyl polymerization. *Prog. Polym. Sci.* 16, 111-172 (1991).

S. Aoshima, S. Kanaoka, A Renaissance in Living Cationic Polymerization. *Chem. Rev.* 109, 5245-5287 (2009).

A. Kanazawa, S. Kanaoka, S. Aoshima, Recent Progress in Living Cationic Polymerization of Vinyl Ethers. *Chem. Lett.* 39, 1232-1237 (2010).

M. Ouchi, M. Sueoka, M. Kamigaito, M. Sawamoto, Stereoregulation in Cationic Polymerization. III. High Isospecificity with the Bulky Phosphoric Acid [(RO) 2 PO2H]/SnCl 4 Initiating Systems: Design of Counteranions via. *Polymer* 2, 1067-1074 (2001).

M. Oishi, H. Yamamoto, Polymerization of t-Butyl Vinyl Ether Mediated by an Aluminum Lewis Acid-TrF System and Its Complex Structure-Tacticity Correlation. *Bull. Chem. Soc. Jpn.* 74, 1445-1454 (2001).

M. Ouchi, M. Kamigaito, M. Sawamoto, Stereoregulation in cationic polymerization by designed Lewis acids. 1. Highly isotactic poly(isobutyl vinyl ether) with titanium-based Lewis acids. *Macromolecules* 32, 6407-6411 (1999).

M. Ouchi, M. Kamigaito, M. Sawamoto, Stereoregulation in cationic polymerization by designed Lewis acids. II. Effects of alkyl vinyl ether structure. *J. Polym. Sci. A Polym. Chem.* 39, 1060-1066 (2001).

K. Brak, E. N. Jacobsen, Asymmetric Ion-Pairing Catalysis. *Angew. Chem. Int. Ed.* 52, 534-561 (2013).

H. Yamamoto, K. Futatsugi, "Designer Acids": Combined Acid Catalysis for Asymmetric Synthesis. *Angew. Chem. Int. Ed.* 44, 1924-1942 (2005).

K. Ishihara, H. Yamamoto, Bronsted Acid Assisted Chiral Lewis Acid (BLA) Catalyst for Asymmetric Diels-Alder Reaction. *J. Am. Chem. Soc.* 116, 1561-1562 (1994).

R. Maji, S. C. Mallojjala, S. E. Wheeler, Chiral phosphoric acid catalysis: from numbers to insights. *Chem. Soc. Rev.* 47, 1142-1158 (2018).

D. Parmar, E. Sugiono, S. Raja, M. Rueping, Complete Field Guide to Asymmetric BINOL-Phosphate Derived Brønsted Acid and Metal Catalysis: History and Classification by Mode of Activation; Brønsted Acidity, Hydrogen Bonding, Ion Pairing, and Metal Phosphates. *Chem. Rev.* 114, 9047-9153 (2014).

T. Akiyama, J. Itoh, K. Fuchibe, Recent Progress in Chiral Brønsted Acid Catalysis. *Adv. Synth. Catal.* 348, 999-1010 (2006).

J.-H. Tay et al., Regiodivergent Glycosylations of 6-Deoxyerythronolide B and Oleandomycin-Derived Macrolactones Enabled by Chiral Acid Catalysis. *J Am. Chem. Soc.* 139, 8570-8578 (2017).

Z. Sun, G. A. Winschel, P. M. Zimmerman, P. Nagorny, Enantioselective Synthesis of Piperidines through the Formation of Chiral Mixed Phosphoric Acid Acetals: Experimental and Theoretical Studies. *Angew. Chem. Int. Ed.* 53, 11194-11198 (2014).

M. Kamigaito, Y. Maeda, M. Sawamoto, T. Higashimura, Living Cationic Polymerization of Isobutyl Vinyl Ether by Hydrogen Chloride/Lewis Acid Initiating Systems in the Presence of Salts: In-Situ Direct NMR Analysis of the Growing Species. *Macromolecules* 26, 1643-1649 (1993).

T. Akiyama, Y. Tamura, J. Itoh, H. Morita, K. Fuchibe, Enantioselective Aza-Diels-Alder Reaction Catalyzed by a Chiral Brønsted Acid: Effect of the Additive on the Enantioselectivity. *Synlett* 2006, 0141-0143 (2006).

Sebastian Hoffmann, and Marcello Nicoletti, B. List*, Catalytic Asymmetric Reductive Amination of Aldehydes via Dynamic Kinetic Resolution (2006), doi:10.1021/JA065404R.

For a comprehensive Lewis acid screen, see Table SX.

D. J. Blundell, On the interpretation of multiple melting peaks in poly(ether ether ketone). *Polymer* 28, 2248-2251 (1987).

R. Paukkeri, A. Lehtinen, Thermal behaviour of polypropylene fractions: 2. The multiple melting peaks. *Polymer* 34, 4083-4088 (1993).

F. Zhang, Y. Gong, T. He, Multiple melting behavior of isotactic polypropylene and poly(propylene-co-ethylene) after stepwise isothermal crystallization. *Eur. Polym. J.* 39, 2315-2322 (2003).

W. Brostow, R. P. Singh, in *Encyclopedia of Polymer Science and Technology* (John Wiley & Sons, Inc., Hoboken, N.J., USA, 2004).

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer comprising diads formed from ethyl vinyl ether, wherein the diads have a tacticity of at least 80% m.

2. The polymer of claim 1, wherein the diads have a tacticity of at least 85% m.

3. The polymer of claim 1, wherein the diads have a tacticity of at least 90% m.

4. A polymer comprising diads formed from n-propyl vinyl ether, wherein the diads have a tacticity of at least 79% m.

5. The polymer of claim 4, wherein the diads have a tacticity of at least 85% m.

6. The polymer of claim 4, wherein the diads have a tacticity of at least 90% m.

7. A polymer comprising diads formed from iso-propyl vinyl ether, wherein diads have has a tacticity of at least 89% m.

8. The polymer of claim 1, wherein the polymer consists of the diads.

9. The polymer of claim 1, wherein the polymer is a copolymer.

10. The polymer of claim 9, wherein the polymer further comprises repeating units formed from a vinyl ether monomer other than ethyl vinyl ether.

11. The polymer of claim 4, wherein the polymer consists of the diads.

12. The polymer of claim 4, wherein the polymer is a copolymer.

13. The polymer of claim 12, wherein the polymer further comprises repeating units formed from a vinyl ether monomer other than n-propyl vinyl ether.

14. The polymer of claim 7, wherein the polymer consists of the diads.

15. The polymer of claim 7, wherein the polymer is a copolymer.

16. The polymer of claim 15, wherein the polymer further comprises repeating units formed from a vinyl ether monomer other than iso-propyl vinyl ether.

* * * * *